(12) United States Patent
Gentile et al.

(10) Patent No.: US 11,668,409 B2
(45) Date of Patent: Jun. 6, 2023

(54) STEPPER MOTOR PROPORTIONAL CONTROL BELLOWS VALVE

(71) Applicant: The Digivac Company, Morganville, NJ (US)

(72) Inventors: James Gentile, Point Pleasant, NJ (US); Tom Bassi, Monroe, NJ (US); Tom Matthews, Howell, NJ (US); William Lewental, Portland, OR (US); Eugene Varshavsky, Matawan, NJ (US)

(73) Assignee: The Digivac Company, Morganville, NJ (US)

( * ) Notice: Subject to any disclaimer, the term of this patent is extended or adjusted under 35 U.S.C. 154(b) by 0 days.

(21) Appl. No.: 17/547,849

(22) Filed: Dec. 10, 2021

(65) Prior Publication Data

US 2022/0186855 A1    Jun. 16, 2022

Related U.S. Application Data

(60) Provisional application No. 63/124,480, filed on Dec. 11, 2020.

(51) Int. Cl.
| | |
|---|---|
| *F16K 31/50* | (2006.01) |
| *F16K 31/42* | (2006.01) |
| *F16K 27/02* | (2006.01) |
| *F16K 31/128* | (2006.01) |
| *F16K 31/04* | (2006.01) |
| *F16K 51/02* | (2006.01) |
| *G05D 7/06* | (2006.01) |

(52) U.S. Cl.
CPC ............ *F16K 31/508* (2013.01); *F16K 27/02* (2013.01); *F16K 31/42* (2013.01); *F16K 31/04* (2013.01); *F16K 31/128* (2013.01); *F16K 51/02* (2013.01); *G05D 7/0635* (2013.01)

(58) Field of Classification Search
CPC ........ F16K 31/04; F16K 31/128; F16K 31/42; F16K 31/508; F16K 51/02; F16K 27/02
USPC ............... 251/129.11, 129.12, 129.13, 335.3
See application file for complete search history.

(56) References Cited

U.S. PATENT DOCUMENTS

| | | | | |
|---|---|---|---|---|
| 350,881 | A | * 10/1886 | Graham et al. | ........ F16K 31/508 251/266 |
| 1,903,229 | A | * 3/1933 | Colman | ................ F16K 31/046 251/80 |
| 4,412,517 | A | * 11/1983 | Kobashi | .................. H02K 7/06 123/588 |
| 4,815,699 | A | * 3/1989 | Mueller | .................. F16K 1/425 251/170 |
| 4,815,899 | A | 3/1989 | Regan | |

(Continued)

FOREIGN PATENT DOCUMENTS

| | | |
|---|---|---|
| JP | 5053397 B2 | 10/2012 |
| WO | 1993025832 A1 | 12/1993 |

*Primary Examiner* — William M McCalister
(74) *Attorney, Agent, or Firm* — Anooj Patel; Kevin Schraven; Hankin Patent Law APC

(57) ABSTRACT

A stepper motor proportionally controlled bellows valve system comprising: a valve manifold; one or more stepper motors; and one or more bellows valves. The one or more bellows valves may comprise a bellows, a sealing washer, and a profile washer. The sealing washer is configured to removeably engage with a vacuum orifice rim. The profile washers are configured to stick into the valve orifice, such that the profile washer defines a flow through the valve.

8 Claims, 36 Drawing Sheets

(56) References Cited

U.S. PATENT DOCUMENTS

| | | | | |
|---|---|---|---|---|
| 5,090,658 | A * | 2/1992 | Kusmer | F16K 1/2268 |
| | | | | 74/625 |
| 5,318,272 | A * | 6/1994 | Smith | F16K 31/04 |
| | | | | 251/129.11 |
| 5,560,586 | A * | 10/1996 | Aruga | F16K 31/04 |
| | | | | 251/266 |
| 7,445,194 | B2 | 11/2008 | Weldon | |
| 7,694,939 | B2 * | 4/2010 | Okitsu | F16K 31/04 |
| | | | | 251/285 |
| 8,033,525 | B2 * | 10/2011 | Wingett | F16K 1/523 |
| | | | | 251/285 |
| 8,671,987 | B2 * | 3/2014 | Gu | F16K 1/52 |
| | | | | 137/630 |
| 8,800,959 | B2 * | 8/2014 | Hasunuma | F16K 41/103 |
| | | | | 251/129.04 |
| 2009/0283708 | A1 * | 11/2009 | Wingett | F16K 1/523 |
| | | | | 251/285 |
| 2010/0001221 | A1 * | 1/2010 | Hasunuma | G05D 16/202 |
| | | | | 251/318 |
| 2011/0140021 | A1 * | 6/2011 | Oike | F16K 31/508 |
| | | | | 251/214 |

* cited by examiner

STEPPER MOTOR PROPORTIONAL CONTROL BELLOWS VALVE

CROSS-REFERENCE TO RELATED APPLICATION

This Patent Application claims priority to U.S. Provisional Patent Application No. 63/124,480, filed on Dec. 11, 2020, the contents of which is expressly incorporated herein by this reference as though set forth in their entirety and to which priority is claimed.

FIELD OF DISCLOSURE

The present disclosure relates to pressure control devices. More specifically, the present disclosure relates to a pressure control device capable of regulating wide range vacuum and evacuation of various systems found in but not limited to vacuum and pressure control, altitude simulation, composite manufacture, distillation and chemistry processes, solvent recovery, vacuum drying, vacuum oven applications, and short path distillation.

BACKGROUND

The vacuum industry is growing rapidly as more scientific and medical researchers are entering the field and developing new methods of processing, extracting and recovering specific chemicals by means of pressure control. Unfortunately, not all vacuum systems are created equally; these processes are not only extremely unique, but also require high precision to deliver high quality results.

These systems generally comprise of different arrays of expensive valves that: (1) can either be operated manually or automatically; (2) driven by different mechanical devices; (3) work best in specific pressure ranges and direction; and/or (4) can be placed in different locations to regulate designated regions of the system. Often, these valves operate in only two states—open and close—and regulate pressure by means of rapid oscillation, which leads to a high failure rate and decreased accuracy.

It is common to find multiple, but unique, vacuum systems in a laboratory or workspace, which are controlled and operated by independent equipment. This leads to increase and redundancy of needed components, which ultimately increases costs. An additional drawback of having multiple differing valves and systems is differing methods of complex control, which ultimately result in differences in precision.

Therefore, a need exists in the field for an economical, automatic pressure control device that provides multi-positional and proportionally controlled that is scalable to support various systems and vacuum system needs. A further need exists for a pressure control device capable of controlling with high precision under a wide pressure range, in any direction. Additionally, there is a need for a pressure control device that has an extensive lifecycle. Finally, there is also a need for a pressure control device capable of controlling multiple vacuum chambers independently while sharing equipment.

SUMMARY

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented hereinbelow. It is to be understood that both the following general description and the following detailed description are exemplary and explanatory only and are not restrictive.

In accordance with the embodiments disclosed herein, the present disclosure is directed to a stepper motor proportional bellows valve device and system.

Before the device of the present disclosure, there were only solenoid open/close type bellows valves on the market. The device of the present disclosure is a proportional bellows valve.

The device and system of the present disclosure may comprise a translationally driven linear stepper motor, which, when combined with a bellows valve capitalizes on the preferred characteristics of manual bellows valves of low leak rate, fine control, and large flow path, but is automatic.

The valve of the device of the present disclosure may have an orifice diameter (flow or flow path) of approximately 0.01 mm to dozens of mm. Preferably the orifice diameter may be 17 millimeters (mm) or even greater, including, but not limited to 20 mm, 40 mm, and 50 mm. Current proportional bellows valves do not open greater than 17 mm.

The device of the present disclosure is the first ever proportional bellows valve. The device of the present disclosure may comprise profile washers that restrict and increase the flow based on their position immediately following the opening or "cracking" of the valve. As such, the orifice size is variable through the use of profile washers that restrict/increase flow based on their position.

The device of the present disclosure may effectively combine two valves in one and use two pressure sources, a vacuum (or a pressure below the desired target pressure) and a positive pressure (or a pressure above the desired target pressure) in order to control the pressure and flow within a system. This allows control of a chamber that is both higher than a target pressure (typical of current vacuum control solutions) and lower than the target pressure (not typical of current vacuum control solutions). This allows both venting and evacuation of a chamber with one valve.

The valve of the device of the present disclosure may control a wide range of pressures from through 1000 Torr to 0.010 Torr. This is a much wider range than prior bellows valve solutions. The larger orifice allows for deeper vacuum control for pressures below 1 Torr. This also allows for faster pump down times, and faster vent times, reducing process times thereby reducing expense. The larger the orifice, the faster, and the more flow.

In one embodiment the device and system of the present disclosure, there is a sensor mounting location.

In one embodiment, the pressure control may comprise five simple configurations that are easy to select: Full Vacuum, Close, Vent, Setpoint, and Recipe.

The device and system of the present disclosure is configured to be modular and may have one or more of the following features and/or benefits: work with a variety of sensors, such as piezo, thermocouple, capacitance manometers; accepting varying profile washers depending on the desired profile of control; accepting varying mounting facilities to better integrate into differing systems (i.e., KF25, KF40, hose barbs).

In some embodiments, multiple valves may be joined together and independently control multiple systems/outputs from a single, shared input.

The device of the present disclosure is much less expensive than alternatives. In order to achieve a similar type of control that the valve of the present disclosure achieves, it would take at least 4 valves, maybe more, and a special manifold with more complicated algorithms, wires, and control. Being able to control the pressure variable for many distillation applications provides for efficiency, yield, and safety. The device of the present disclosure saves time, reduces wear and tear on pumps, and reduces waste.

Preferably, the valve device of the present disclosure enables reliable, long lasting medium vacuum pumps to be used in rough vacuum applications. Prior to the valve device of the present disclosure, different types of vacuum pumps for different types of processes had to be used. For those types of processes that needed a pressure in the rough vacuum regime then diaphragm pumps would be used, and in the medium vacuum regime only scroll or rotary vane pumps would be used. The valve device of the present disclosure may be used for all of these processes, saving costs and complexity of system.

In various embodiments, there may be provided a pressure control device and system includes a linear stepper motor, a motor mounting plate, a plunger adapter, and a bellows, wherein the linear stepper motor includes a motor lead screw, wherein the linear stepper motor connects to the motor mounting plate, wherein the motor lead screw connects to the plunger adapter, wherein the plunger adapter connects to the bellows, and wherein a rotational motion of the motor lead screw is converted into a linear motion of the plunger adapter and the bellows.

In some embodiments, there may be provided a pressure control device and system comprising: a linear stepper motor, a motor mounting plate, a plunger adapter, a bellows, a shoulder bolt, a support washer, a sealing washer, and a profile washer. The linear stepper motor may comprise a motor lead screw, wherein the linear stepper motor is configured to engage with the motor mounting plate, wherein the motor lead screw is configured to engage with the plunger adapter, wherein the plunger adapter is configured to engage with the bellows, wherein a rotational motion of the motor lead screw is converted into a linear motion of the plunger adapter and the bellows, wherein the shoulder bolt is configured to engage with the plunger adapter, wherein the shoulder bolt is further configured to engage with the support washer, wherein the shoulder bolt is further configured to engage with the sealing washer, wherein the profile washer is configured to engage with the shoulder bolt, and wherein the bellows, the plunger adapter, the shoulder bolt, the support washer, the sealing washer, and the profile washer form a rigid assembly.

In some embodiments, there may be provided a pressure control device and system comprising: a linear stepper motor, a motor mounting plate, plunger adapter, a bellows, a shoulder bolt, a support washer, a sealing washer, a profile washer, a valve receptacle and an O-ring. The pressure control device and system may further comprise wherein the linear stepper motor comprises a motor lead screw, wherein the linear stepper motor is configured to engage with the motor mounting plate, wherein the motor lead screw is configured to engage with the plunger adapter, wherein the plunger adapter is configured to engage with the bellows, wherein a rotational motion of the motor lead screw is converted into a linear motion of the plunger adapter and the bellows, wherein the shoulder bolt is configured to engage with the plunger adapter, wherein the shoulder bolt is further configured to engage with the support washer, wherein the shoulder bolt is further configured to engage with the sealing washer, wherein the profile washer is configured to engage with the shoulder bolt, wherein the bellows, the plunger adapter, the shoulder bolt, the support washer, the sealing washer, and the profile washer form a rigid assembly, wherein the rigid assembly fits into the valve receptacle, wherein the O-ring is configured to engage with a base of the bellows, and wherein the O-ring is configured to engage with the valve receptacle so as to create a seal.

One embodiment may be a proportionally controlled bellows valve for regulating air flow, comprising: a sealing washer; a support washer; a bellows; a plunger adapter; and a shoulder bolt; wherein the plunger adapter is configured to matingly engage with a motor lead screw of a stepper motor; wherein the bellows is connected to the plunger adapter, such that the plunger adapter is configured to translate rotational motion of the stepper motor into linear motion of the bellows, such that the bellows is configured to compress and expand based on rotational motion of the stepper motor; wherein the shoulder bolt is connected to the bellows and the plunger adapter, and wherein the shoulder bolt is configured to allow the sealing washer to be mounted on the bellows; wherein the support washer is connected to the bellows and the sealing washer; and wherein the sealing washer is configured to releasably engage with an orifice rim of a valve manifold. The proportionally controlled bellows valve may further comprise a profile washer, wherein the shoulder bolt is configured to allow mounting of the profile washer, such that the profile washer is configured to protrude into a valve orifice of the valve manifold, such that a shape and position of the profile washer within the valve orifice defines a flow of fluid through the valve orifice. The bellows may be configured to be connected to a motor mounting plate, which is itself configured to preferably engage with the valve manifold. The valve manifold may be configured to provide one or more inputs and an output to the proportionally controlled bellows valve. The profile washer may be configured to be removed and replaced with a replacement profile washer that provides for a different flow of fluid through the valve orifice.

Another embodiment may be a stepper motor proportionally controlled bellows valve system comprising: one or more valve assemblies; wherein each of the one or more valve assemblies comprises: a valve manifold; wherein the valve manifold comprises a valve ventilation channel, an output port, a valve vacuum channel, a ventilation orifice, a ventilation orifice rim, a vacuum orifice, and a vacuum orifice rim; two linear stepper motors, wherein each of the two liner stepper motors comprises a motor lead screw; a motor mounting plate, wherein the motor mounting plate are configured to mount the two liner stepper motors to the valve manifold; a vacuum bellows valve; and a ventilation bellows valve. Each of the vacuum bellows valve and the ventilation bellows valve comprises: a support washer; a sealing washer; a support washer; a bellows; a plunger adapter; and a shoulder bolt; wherein the plunger adapter is configured to matingly engage with the motor lead screw of one of the stepper motors; wherein the bellows is connected to the plunger adapter, such that the plunger adapter is configured to translate rotational motion of one of the stepper motors into linear motion of the bellows, such that the bellows is configured to compress and expand based on rotational motion of one of the stepper motors; wherein the shoulder bolt is connected to the bellows and the plunger adapter, and wherein the shoulder bolt is configured to allow the sealing washer to be mounted on the bellows; wherein the support washer is connected to the bellows and the sealing washer; wherein the sealing washer is configured to releasably engage with one of the two orifice rims; wherein the shoulder bolt is configured to allow mounting of a profile washer, such that the profile washer is configured to protrude into one of the two valve orifices of the valve manifold, such that a shape and position of the profile washer defines a flow of fluid through one of the two valve orifices. The valve manifold may further comprise a sensor port, which is configured to engage with a sensor. The sensor may monitor an output flow. The stepper motor proportionally controlled bellows valve system may further comprise: an input assembly. The input assembly may comprise: a vacuum port that is configured to engage a vacuum input; a ventilation port that is configured to engage a ventilation input; an input ventilation channel; and an input vacuum channel. The input assembly may be configured to be directly or indirectly connected to all of the one or more valve assemblies, such that the input ventilation channel is in fluid communication with each of the one or more valve ventilation channels and the one or more valve vacuum channel. The stepper motor proportionally controlled bellows valve system may further comprise two endplates, wherein the two endplates may be configured to be on the ends of the stepper motor proportionally controlled bellows valve system. The profile washer may be configured to be removed and replaced with a replacement profile washer that is more or less restrictive to the flow of fluid.

Another embodiment is a stepper motor proportionally controlled bellows valve system comprising: a valve manifold; a ventilation stepper motor; a vacuum stepper motor; a ventilation bellows valve; and a vacuum bellows valve; wherein the ventilation bellows valve comprises a ventilation bellows, a ventilation sealing washer, and a ventilation profile washer; wherein the vacuum bellows valve comprises a vacuum bellows, a vacuum sealing washer, and a vacuum profile washer; wherein the valve manifold comprises an output, a ventilation input, a vacuum input, a vacuum orifice, a vacuum orifice rim, a ventilation orifice, and a ventilation orifice rim; wherein the vacuum sealing washer is configured to removeably engage with the vacuum orifice rim; wherein the ventilation sealing washer is configured to removeably engage with the vacuum orifice rim; wherein the vacuum profile washer is configured to protrude into the vacuum orifice, such that a shape and position of the vacuum profile washer defines a vacuum flow through the vacuum orifice; and wherein the ventilation profile washer is configured to protrude into the ventilation orifice, such that a shape and position of the ventilation profile washer defines a ventilation flow through the ventilation orifice. The valve manifold may further comprise a sensor port that may be configured to connect to a sensor. The sensor may monitor an output flow through the output. The ventilation stepper motor, the vacuum stepper motor, the sensor, the vacuum profile washer, and the ventilation profile washer may be configured to allow precisely and automatically controlling the output flow. The vacuum and/or ventilation profile washers may be configured to be removed and replaced with replacement vacuum and/or ventilation profile washers that are more or less restrictive to the vacuum flow.

Although some parts are listed as discrete and separate parts, any part may be unitarily connected to one or more of the other parts or may be made up of subparts themselves.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure As it will be realized, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE ILLUSTRATIVE EMBODIMENTS

Figure 1:
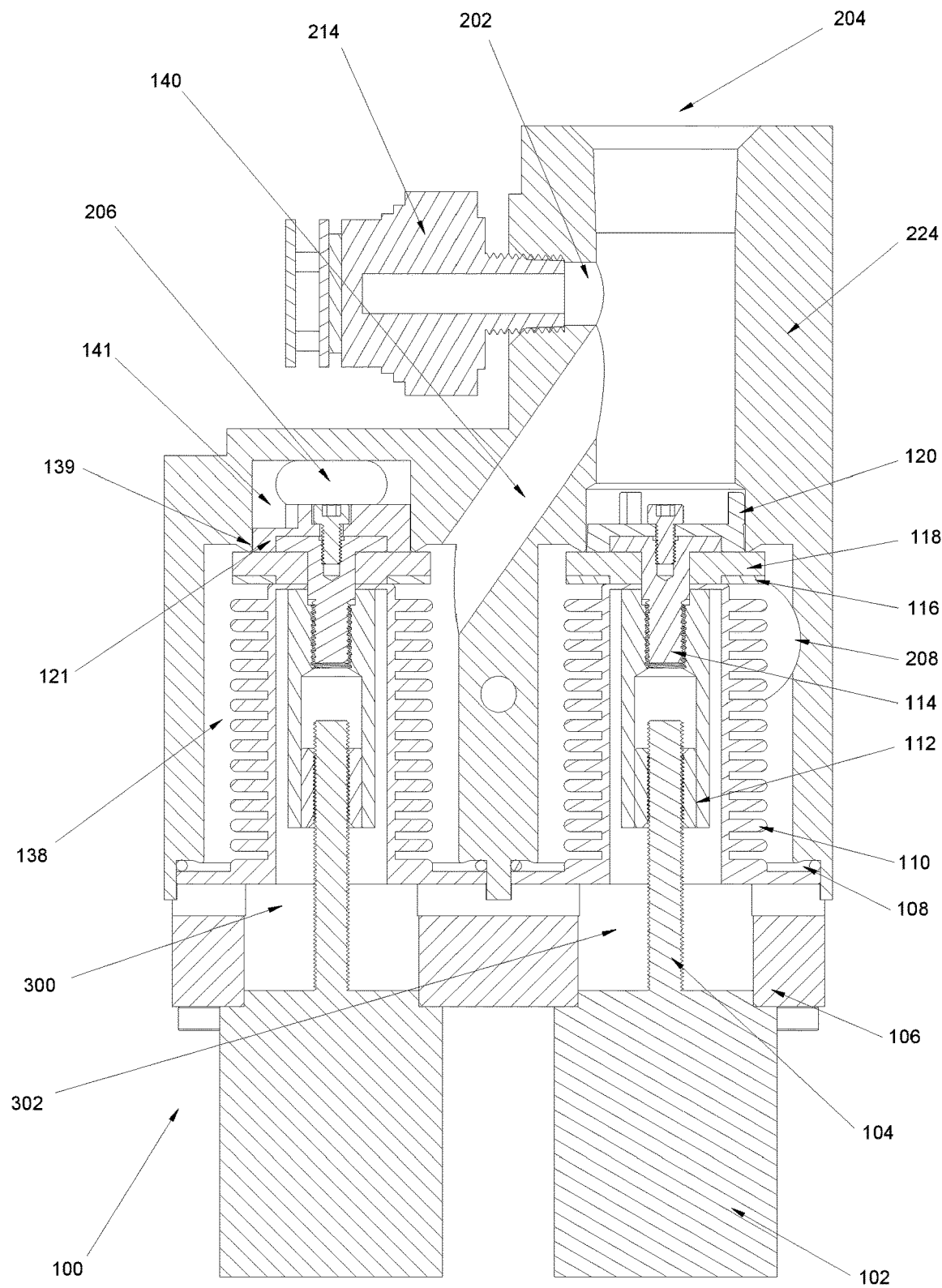
FIG. 1 is an illustration of a cross-section view of an exemplary stepper motor proportionally controlled bellows double valve system with a sensor connected to the valve manifold in accordance with some embodiments of the present disclosure.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware embodiments. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-40% from the indicated number or range of numbers.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details.

As used herein the term "stepper motor" refers to is a brushless direct current (DC) electric motor that divides a full rotation of the motor/shaft into a number of equal steps. In some embodiments, the motor's position can be executed to turn and hold at one of the steps without the need for a position sensor for providing feedback, which is referred to as an open-loop controller, but this does require the motor to be correctly sized to the use with respect to torque and speed. Stepper motors generally have multiple toothed or geared electromagnets arranged as a stator around a central rotor, which may be a gear-shaped metal, typically made of iron. The electromagnets are energized by an external driver circuit or a micro controller. To make the motor shaft turn, a first electromagnet is given power, which magnetically attracts the gear's teeth. When the gear's teeth are aligned to the first electromagnet, they are slightly offset from the next electromagnet. When the next electromagnet is turned on and the first is turned off, the gear rotates slightly to align with the next one. The process is repeated correspondingly. Each of the mini-rotations is called a step, with the number of gear points of steps making a full rotation. This step movement allows the motor to be turned at a precise angle.

As used herein the term "proportionally controlled" refers to providing a change in output pressure or flow in the same ratio as the change in the input pressure or flow. Thus, if the input flow doubles then the output flow will also double. The term "proportionally controlled" also refers to the movement of the bellows essentially being a continuous movement, such that the exact position of the valve can be controlled. This is as opposed to being only two positions: fully open or fully closed. A proportionally controlled valve may be closed, fully open, and partially open ranging between fully open and closed.

FIG. 1 is an illustration of a cross-section view of an exemplary stepper motor proportionally controlled bellows double valve system with a sensor connected to the valve manifold in accordance with some embodiments of the present disclosure. As shown in FIG. 1, stepper motor proportionally controlled bellow valve system 100 may comprise: one or more valves 300, 302 (two are shown in the embodiment shown in FIG. 1), one or more stepper motors 102 each having a motor lead screw 104, a motor mounting plate 106, one or more O-rings 108, one or more bellows 110, one or more plunger adapters 112, one or more shoulder bolts 114, one or more support washers 116, one or more sealing washers 118, and one or more profile washers 120, 121. Stepper motor proportionally controlled bellow valve system 100 may further comprise a sensor port 202, output port 204, ventilation channel 206, vacuum channel 208, sensor 214, and valve manifold 224.

As shown in FIG. 1, in some embodiments, the one or more stepper motors 102 of stepper motor proportionally controlled bellow valve system 100 may be connected to the motor mounting plate 106 such that the motor mounting plate 106 may allow for the mounting of the one or more stepper motors 102. The motor mounting plate 106 may also be connected to the valve manifold 224 such that the motor mounting plate 106 may allow for the mounting of the valve assembly into the valve manifold 224. The valve assembly may comprise the one or more O-rings 108, the one or more bellows 110, the one or more plunger adapters 112, the one or more shoulder bolts 114, the one or more support washers 116, the one or more sealing washers 118, and the one or more profile washers 120, 121.

As shown in FIG. 1 and as would be understood by one or ordinary skill in the art, the one or more stepper motors 102 may drive the bellows 110 such that the position of the valve within the orifice 141 of the valve manifold 224 is defined. In some embodiments, the one or more stepper motors 102 may comprise linear stepper motors that allow for micro stepping such that the one or more stepper motors 102 allow for precise and variable control of the one or more bellows 110 and the valve position within the orifice 141 of the valve manifold 224. FIG. 1 shows the two valves 300, 302 in a closed position.

As shown in FIG. 1, the one or more plunger adapters 112 may connect to the one or more motor lead screws 104 of the one or more stepper motors 102. The one or more plunger adapters 112 may translate the rotational motion of the one or more stepper motors 102 into linear or translational actuation of the one or more bellows 110. In some embodiments, the one or more plunger adapters 112 may be threaded and thus may be interlaced with the threads of the one or more motor lead screws 104 of the one or more stepper motors 102.

As shown in FIG. 1, the one or more bellows 110 may be connected to the one or more plunger adapters 112 such that the one or more plunger adapters 112 are able to change the rotational motion of the one or more stepper motors 102 into linear or translational motion of the one or more bellows 110. The one or more bellows 110, may therefore be adapted to compress and expand based on the translational motion defining a position of the valve within the orifice 141 of the valve manifold 224.

In some embodiments, the one or more bellows 110 may also create a seal from ambient air and substantially prevents stem leakage, which is leakage to or from the interior of the valve 300 to the valve chamber 138. In some embodiments the one or more bellows 110 may be constructed from stainless steel. In other embodiments, the one or more bellows 110 may be constructed from a different material such as aluminum, plastic, or a composite material.

As shown in FIG. 1, the one or more support washers 116 may connect to the one or more bellows 110 and the one or more sealing washers 118. The one or more support washers 116 may be constructed of a sufficiently rigid material such that the one or more support washers 116 give rigidity and support to the one or more sealing washers 118. The one or more sealing washers 118 may be connected to the one or more support washers 116 and the one or more profile washers 120, 121. The one or more sealing washers 118 may preferably be constructed of a sufficiently pliable material such that the one or more sealing washers 118 create a seal against the valve orifice rim 139. The one or more sealing washers 118 may thereby prevent the entrance of ambient air or other materials into the valve chamber 138 of the valve manifold 224 from the ventilation channel 206. When the valve is in a cracked or open position, the sealing washers 118 are not sealed against the orifice rim 139, and the orifice 141 is open and fluid may flow from the ventilation channel 206, into the valve chamber 138 and out through passageway 140, past sensor 202, and out of output 204.

As shown in FIG. 1, the one or more shoulder bolts 114 may be connected to the one or more bellows 110 and the one or more plunger adapters 112. The one or more shoulder bolts 114 may also be constructed and positioned such that the one or more shoulder bolts 114 allow the one or more sealing washers 118—and thereby the one or more support washers 116—to be mounted to the one or more bellows 110.

In some embodiments, the one or more shoulder bolts 114 may also be constructed and positioned so as to allow the mounting of the one or more profile washers 120, 121. The one or more profile washers 120, 121 may thereby protrude into the valve orifice 141 of the valve manifold 224 such that the shape and position of the one or more profile washers 120, 121 within the valve orifice of the valve manifold 224 defines the flow of air through the valve orifice of the valve manifold 224.

As shown in FIG. 1, the profile washers 120, 121 are not identical in shape and position. The variability of the shape of the profile washers used in the system of the present disclosure allows for the user to create the desired valve orifice when combined with the stepper motor causing the one or more sealing washers 118 to move away from the manifold orifice rim 139.

Figure 30:
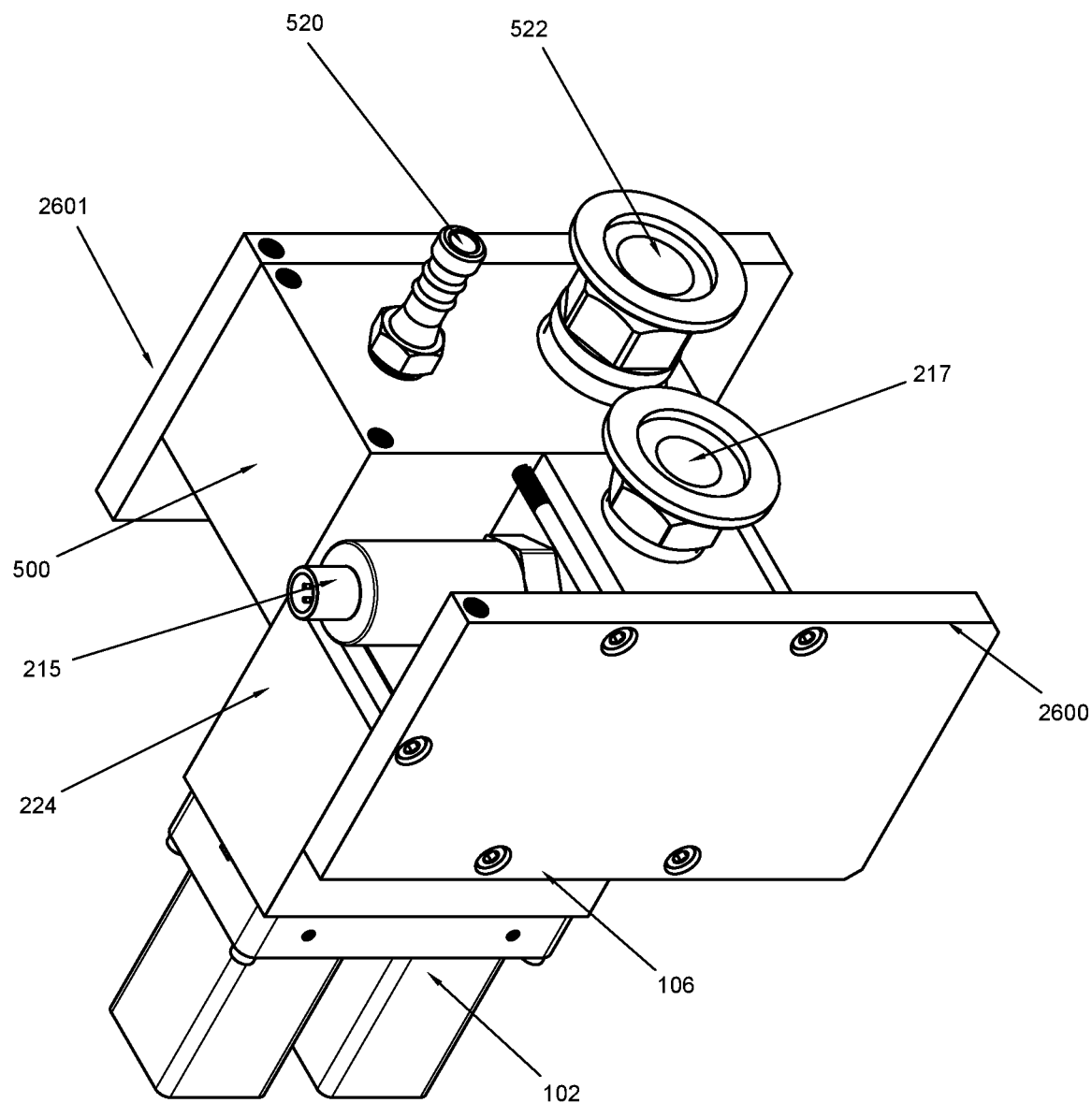
FIG. 30 is an illustration of a perspective view of an exemplary stepper motor proportionally controlled bellows double valve system that is connected to two endplates and an input manifold, in accordance with some embodiments of the present disclosure.
Figure 31:
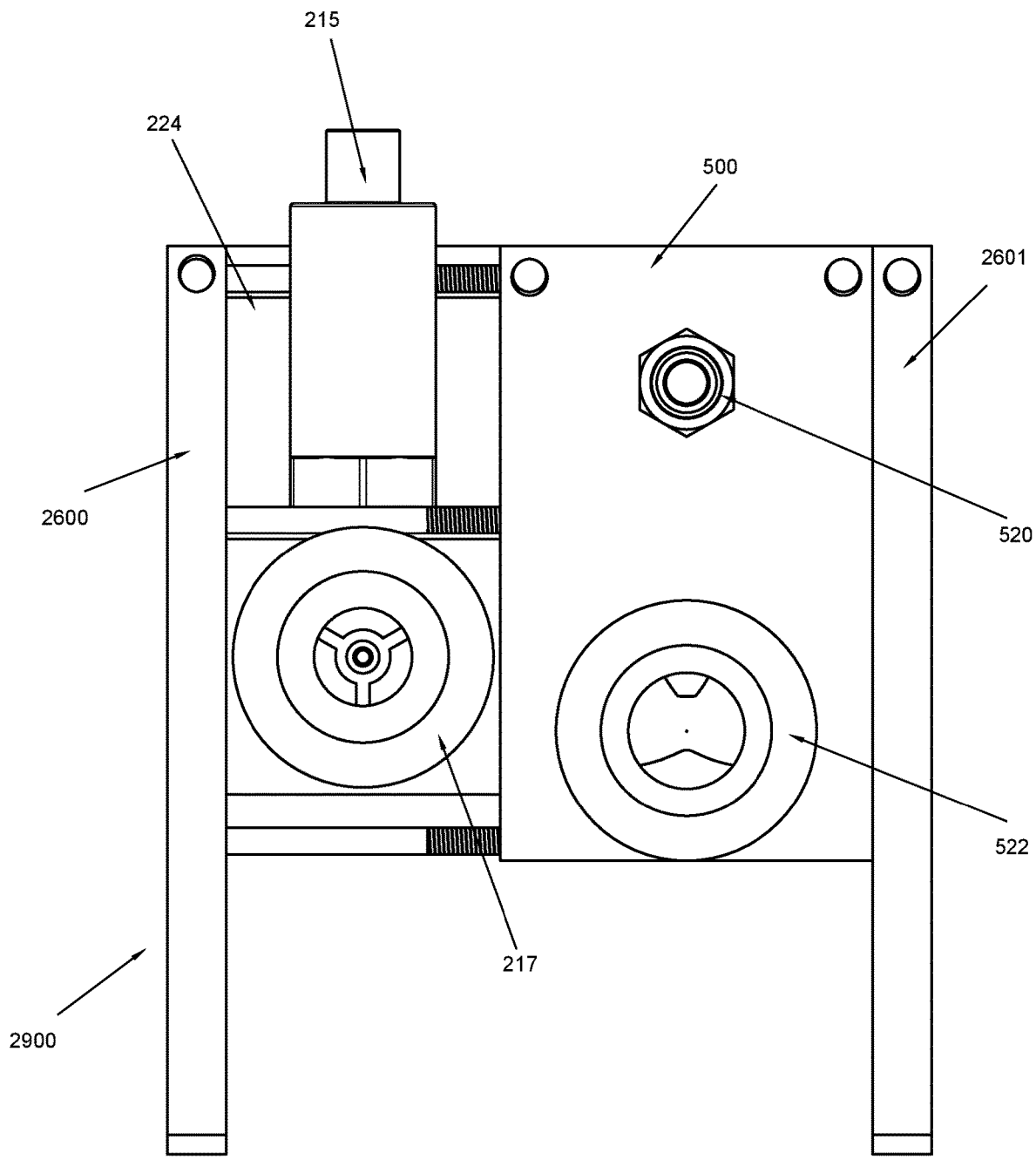
FIG. 31 is an illustration of a front view of an exemplary stepper motor proportionally controlled bellows double valve system that is connected to two endplates and an input manifold, in accordance with some embodiments of the present disclosure.

As shown in FIG. 1, the valve manifold 224 may allow for the mounting of an integral sensor, such as sensor 214. In some embodiments, the valve manifold 224 may also allow for the mounting to a larger sensor, such as depicted in FIGS. 30-31. In some embodiments, valve system of the present disclosure may also allow for the joining of multiple valve manifolds 224 together in order to create a stepper motor proportionally controlled bellows valve manifold system allowing for independent control of multiple systems and outputs.

It will be appreciated by one or ordinary skill in the art that the bellows valve may instead be implemented using a plunger type valve with a sealing ring or base. It will also be appreciated by one or ordinary skill in the art that the same effect as the one or more profile washers 120, 121 may be achieved through the use of a machined plunger.

As shown in FIG. 1, the stepper motor proportionally controlled bellow valve system 100 is translationally driven. In each of the one or more stepper motors 102, the one or more threaded plunger adapters 112 mate the one or more bellows 110 to the one or more stepper motors 102 via the one or more motor lead screws 104 of the one or more stepper motors 102. The one or more plunger adapters 112 may also be secured to the sealing end of the one or more bellows 110 by way of the one or more shoulders bolts 114.

In some embodiments the one or more shoulder bolts 114 may first be dressed with a Viton® (fluoroelastomer) sealing washer such as the one or more sealing washers 118, which may then be backed by a support washer such as the one or more support washers 116. It will be appreciated by one or ordinary skill in the art that other types of fluorocarbons, fluoroelastomers, or other similarly pliable material made be used to construct the one or more sealing washers 118, such that the one or more sealing washers 118 may provide a proper and repetitive seal when they are squeezed between two rigid structures. The shafts of the one or more shoulder bolts 114 may be fed through a clearance hole in the head of the one or more bellows 110. The one or more sealing washers 118 may then be held to the head of the one or more bellows 110 via the shoulder bolt 114 and the one or more plunger adapters 112 may be attached to the threaded shafts of the one or more shoulder bolts 114 such that a rigid assembly is created to support the one or more sealing washers 118.

In some embodiments, a profile washer, such as the one or more profile washers 120, 121, may then be mounted to the one or more shoulder bolts 114. The one or more stepper motors 102 may also be secured to the motor mounting plate 106. The one or more motor lead screws 104 of the one or more stepper motors 102 may be threaded into the opposing ends of the one or more plunger adapters 112 such that the rotational motion of the one or more stepper motors 102 is translated into translational motion by the one or more plunger adapters 112.

In some embodiments, the bases of the one or more bellows 110 may connect to and mate against the motor mounting plate 106 and the one or more bellows 110 and the motor mounting plate 106 may be secured to the valve manifold 224. A seal may be created between the bases of the one or more bellows 110 and the valve receptacle within the valve manifold 224 by compressing an O-ring such as the one or more O-rings 108.

As shown in FIG. 1, the one or more sealing washers 118 may be compressed against the edge of the valve orifice rim 141 of the valve manifold 224 when they are at rest (in a closed position). The one or more profile washers 120, 121 may extend into the valve orifice of the valve manifold 224.

In some embodiments, a voltage may be applied to a non-captive linear stepper motor such as the one or more stepper motors 102. It shall be appreciated that different types of stepper motors may be used as long as they are able to precisely translate rotational motion into linear motion. For example, one of ordinary skill in the art would recognize at least captive, non-captive, and external nut stepper motors as options for the one or more stepper motors 102. The voltage applied to the non-captive linear stepper motor may cause the motor lead screw such as the one or more motor lead screws 104 to rotate. The one or more plunger adapters 112 may be held stationary by the one or more shoulder bolts 114 while the one or more motor lead screws 104 rotates such that the rotational motion of the one or more motor lead screws 104 is translated linearly as the one or more plunger adapters 112 travel axially along the one or more motor lead screws 104.

As the one or more plunger adapters 112 travel axially along the one or more motor lead screws 104, the resulting translational motion causes the one or more bellows 110 to compress. The compression of the one or more bellows 110 ultimately lifts (or lowers, depending on the perspective) the one or more sealing washers 118 away from the valve orifice rim 139 of the valve manifold 224 and lifts the one or more profile washers 120, 121 out of the valve orifice 141, permitting the flow of air. It will be appreciated that both the contour of the one or more profile washers 120, 121 and positions of the one or more profile washers 120, 121 change the flow profile, allowing for variable and accurate flow control.

As shown in FIG. 1, stepper motor proportionally controlled bellow valve system 100 may further comprise a sensor port 202 and sensor 214. The stepper motor proportionally controlled bellow valve system 100 therefore allows for a sensor to be mounted directly on the valve manifold 224 to allow for ease of installation. This is in contrast with existing systems that require a sensor to be placed elsewhere in the system further from the valve and the valve manifold. Sensor port 202 is preferably configured to connect with a sensor such as sensor 214 such that sensor 214 connects directly into sensor port 202 of the valve manifold 224.

In some embodiments, the sensor 214 of stepper motor proportionally controlled bellow valve system 100 may be adapted to monitor the pressure within an output such as output port 204. The data and information gathered by sensor 214 may be used to control both vacuum valve 302 and ventilation valve 300. The data gathered by the sensor can also be used to increase the vacuum generated in the vacuum chamber.

Advantageously, the stepper motor proportionally controlled bellow valve system 100 exhibits the desirable characteristics of manual bellows valves, such as low leak rate, fine control, and large flow path, but the stepper motor proportionally controlled bellow valve system 100 integrates these qualities with an automated valve that may have a variable sized orifice due to the profile washers 120, 121. The system may function without the profile washers, but this is not a preferred embodiment.

The stepper motor proportionally controlled bellow valve system 100 may enable a high degree of control for both very small flow and very large flow. This is in part because the stepper motor proportionally controlled bellow valve system 100 has both a widely variable orifice and an extremely large effective orifice or flow path, especially when compared with other proportional valves, such as plunger valves. Generally, the variable size orifice is due to the movement of the bellows, but the use of different profile washers can affect the flow when opening and closing the valve.

In some embodiments, the size of the effective orifice or flow path of the stepper motor proportionally controlled bellow valve system 100 may be as large as 17 mm, 20 mm, 40 mm, 50 mm, or even greater. It will be appreciated by one of ordinary skill in the art that these numbers are not meant to be limited but to depict the breadth of the flow allowed by the stepper motor proportionally controlled bellow valve system 100. This large orifice also allows for faster pump down times and faster vent times, effectively reducing the process times and thereby reducing the expenses involved.

In some embodiments, the specialty profile washers such as the one or more profile washers 120, 121 allow for restricting or increasing of the flow based on the positioning, contours, and/or shape of the one or more profile washers 120, 121. The one or more profile washers 120, 121 may restrict and increase the flow immediately following the opening or "cracking" of the valve. In this way, the effective orifice size is variable through the use, adjustment, and positioning of the one or more profile washers 120, 121. The profile washers 120, 121 are preferably specifically tailored to the needs of the specific processes being run on the user devices. The profile washers 120, 121 may be sculpted to allow an immediate large orifice with only a small crack of the valve, or they may be made to allow a lengthy opening by expanding the orifice in very small increments. The profile washers 120, 121 may be removed and replaced with different profile washers that provide a different shape, profile, orifice opening duration and size, and flow.

In some embodiments, the vacuum valve 302 and the ventilation valve 300 are not opened simultaneously. In other embodiments, they are opened at the same time, depending on the needs of the user machine that is connected to the valve system 100.

Advantageously, in some embodiments, the stepper motor proportionally controlled bellow valve system 100 is not a two way or a three-way valve but effectively combines two valves into one. The stepper motor proportionally controlled bellow valve system 100 may make use of two different pressure sources, a vacuum, defined as a pressure below the desired target pressure, and a positive pressure, defined as a pressure above the desire target pressure. The stepper motor proportionally controlled bellow valve system 100 uses these two pressure sources to effectively control the pressure and flow within the system. The vacuum is supplied via the vacuum channel 208 and the positive pressure or ambient air may be supplied via the ventilation channel 206.

The two different pressure source system used in the stepper motor proportionally controlled bellow valve system 100 allows control of a chamber or device connected to an output port, such as output port 204, when that chamber is both higher and lower than the target pressure. Effectively, this system allows for both the pressurizing and evacuation (venting) of a chamber associated with an output port with a single valve system, such as system 100.

The stepper motor proportionally controlled bellow valve system 100 may preferably have a wide range of pressures and may control at least six decades of pressure, ranging from approximately 1000 Torr to 0.010 Torr.

The stepper motor proportionally controlled bellow valve system 100 may also include a simplified pressure control allowing robust pressure control with only five push button commands: full vac, close, vent, setpoint, and recipe. This simplified pressure control user interface hides the complexity from the user and allows for five basic functions, making the stepper motor proportionally controlled bellow valve system 100 easy to operate. Typically, the ventilation valve and vacuum valve are controlled via a computerized control module that is programmed to run specific algorithms that supply the pressure or vacuum needed by the end user device. The sensors may provide feedback to the control module, which may then precisely adjust the vacuum valves and ventilation valves of the present disclosure.

Figure 33:
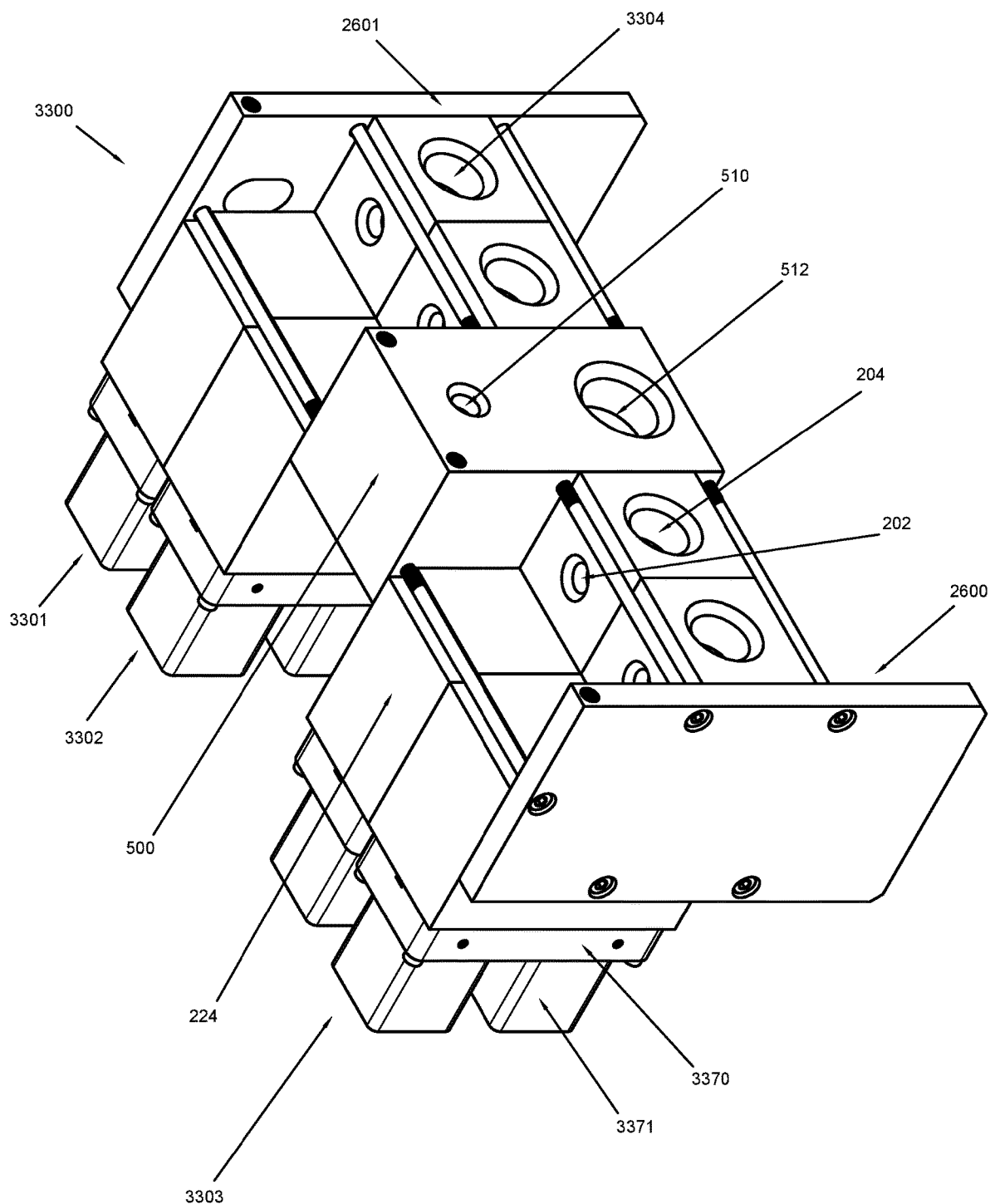
FIG. 33 is an illustration of a perspective view of an exemplary stepper motor proportionally controlled bellows valve manifold system in accordance with some embodiments of the present disclosure.
Figure 34:
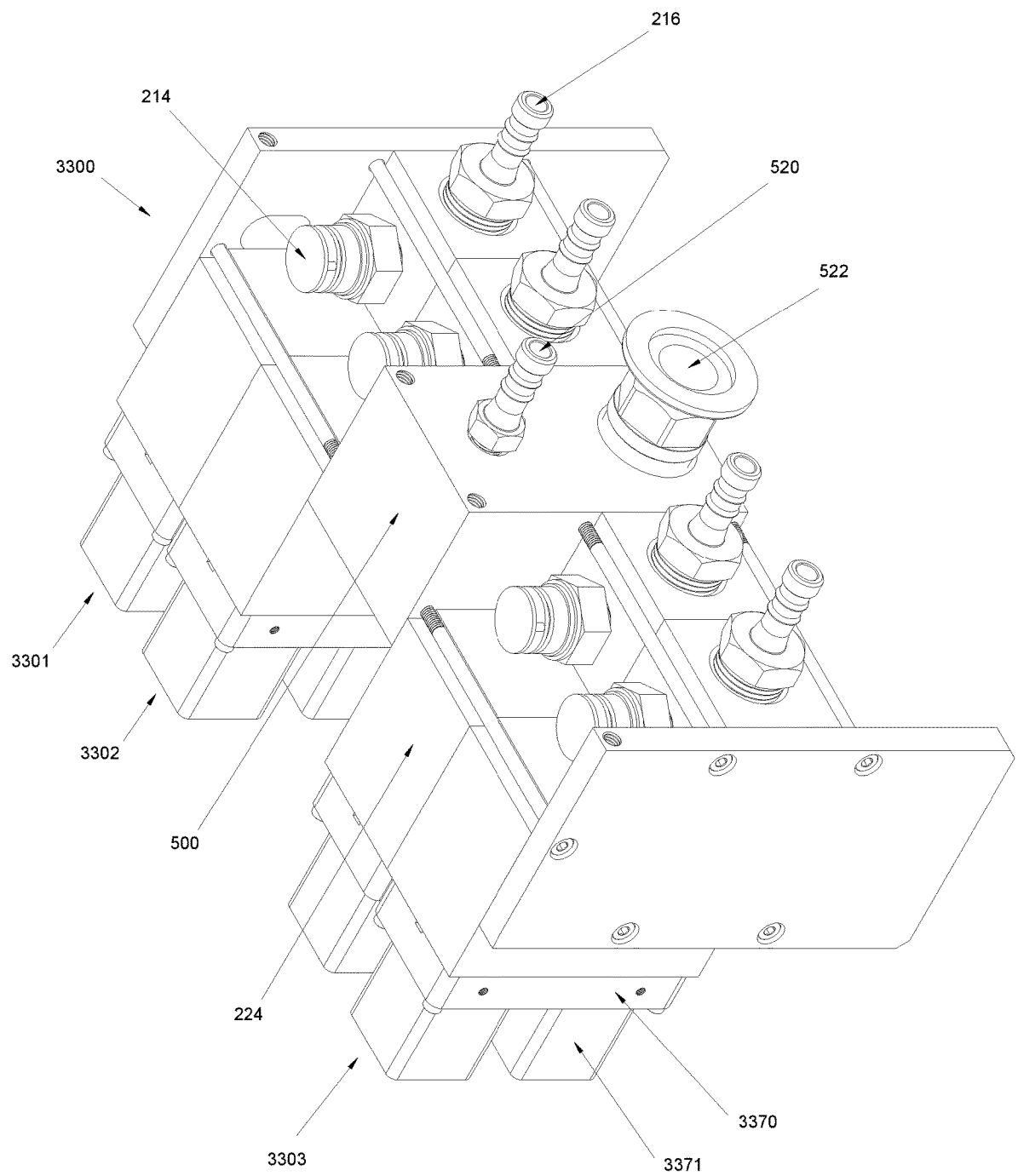
FIG. 34 is an illustration of a perspective view of an exemplary stepper motor proportionally controlled bellows valve manifold system with sensors and outputs in accordance with some embodiments of the present disclosure. ventilation input, vacuum input, and a plug in accordance with some embodiments of the present disclosure.

In some embodiments, the stepper motor proportionally controlled bellow valve system 100 may also be modular and fit into systems with multiple valve systems as shown in FIGS. 33-34. The stepper motor proportionally controlled bellow valve system 100 may also accept various mounting facilities in order to allow ease of integration into existing systems. A nonlimiting list of known systems that the stepper motor proportionally controlled bellow valve system 100 can interface into includes KF25, KF40, and hose barbs systems.

In some embodiments, the sensor 214 may comprise various different sensors depending on the control range. As a nonlimiting list, the sensor 214 may comprise piezo sensors, thermocouple sensors, Pirani gauges, and capacitance manometers.

The stepper motor proportionally controlled bellow valve system 100 is a much less expensive system than any other alternatives that would accomplish the same tasks as the system 100. In order to achieve a similar type of control as the stepper motor proportionally controlled bellow valve system 100, a minimum of four valves would be required as well as a special manifold with extremely complicated algorithms, wires, and control. The large degree of control allowed by the stepper motor proportionally controlled bellow valve system 100 may increase efficiency, yield, and safety for a variety of distillation applications. The system 100 may also save time, reduce wear and tear on pumps, and reduce waste.

The stepper motor proportionally controlled bellow valve system 100 allows the use of reliable and long lasting medium vacuum pumps in rough vacuum applications. By using the stepper motor proportionally controlled bellow valve system 100, the same level of control normally requiring a whole menagerie of different vacuum pumps can be achieved in a single pump valve system, saving costs and reducing complexity.

Figure 2:
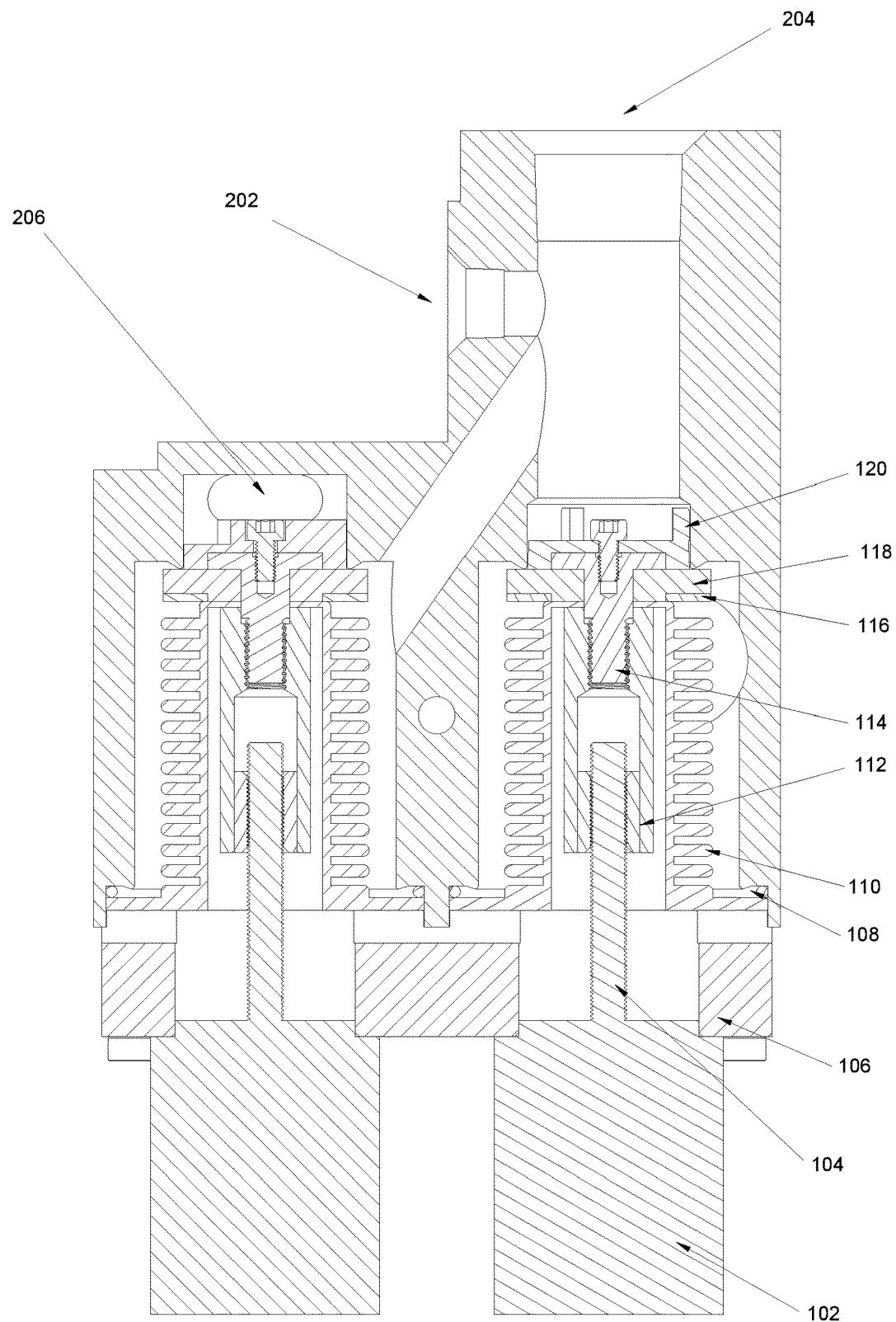
FIG. 2 is an illustration of a cross-section view of an exemplary stepper motor proportionally controlled bellows double valve manifold without a sensor in accordance with some embodiments of the present disclosure.

FIG. 2 is an illustration of a cross-section view of an exemplary stepper motor proportionally controlled bellows double valve system, wherein the valve manifold is not connected to a sensor in accordance with some embodiments of the present disclosure. As shown in FIG. 2, stepper motor proportionally controlled bellow valve system 100 may comprise: one or more stepper motors 102 each having a motor lead screw 104, a motor mounting plate 106, one or more O-rings 108, one or more bellows 110, one or more plunger adapters 112, one or more shoulder bolts 114, one or more support washers 116, one or more sealing washers 118, and one or more profile washers 120. Stepper motor proportionally controlled bellow valve system 100 may further comprise the sensor port 202, output port 204, ventilation channel 206, vacuum channel 208, and the valve manifold 224.

As shown in FIG. 2, stepper motor proportionally controlled bellow valve system 100 may not comprise a sensor 214 integrally connected to the valve manifold 224. In some embodiments, therefore, stepper motor proportionally controlled bellow valve system 100 may comprise a sensor such as sensor 214 of FIG. 1, placed elsewhere in the system. It will be appreciated by one of ordinary skill in the art that the inclusion of an integral sensor such as sensor 214 of FIG. 1 is advantageous for ease of integration and installation.

Figure 3:
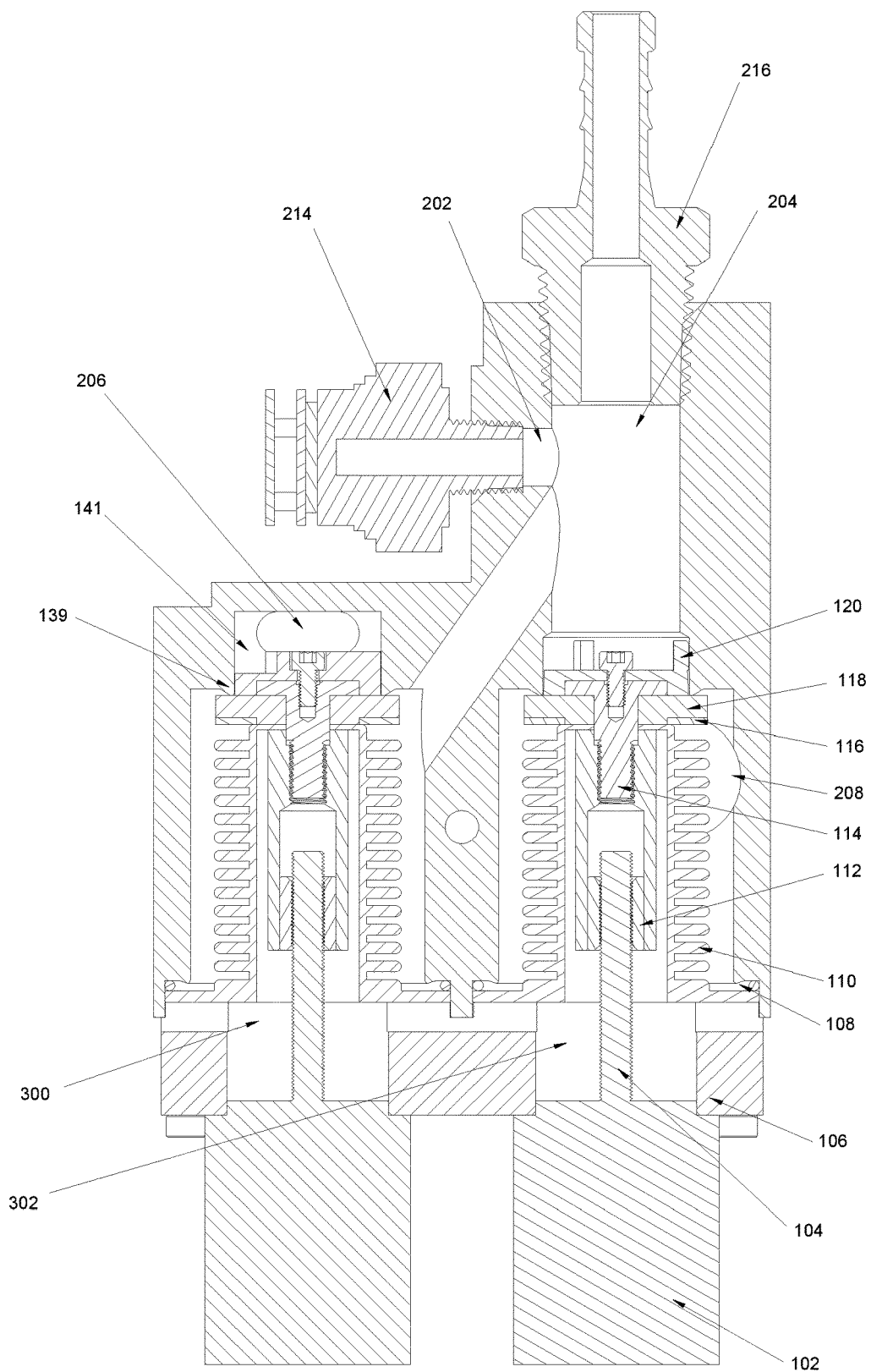
FIG. 3 is an illustration of a cross-section view of an exemplary stepper motor proportionally controlled bellows double valve manifold with a sensor and an output in accordance with some embodiments of the present disclosure.

FIG. 3 is an illustration of a cross-section view of an exemplary stepper motor proportionally controlled bellows double valve system with a sensor and an output connected to the valve manifold in accordance with some embodiments of the present disclosure. As shown in FIG. 3, stepper motor proportionally controlled bellow valve system 100 may comprise: one or more stepper motors 102 each having a motor lead screw 104, a motor mounting plate 106, one or more O-rings 108, one or more bellows 110, one or more plunger adapters 112, one or more shoulder bolts 114, one or more support washers 116, one or more sealing washers 118, and one or more profile washers 120. Stepper motor proportionally controlled bellow valve system 100 may a further comprise sensor port 202, output port 204, ventilation channel 206, vacuum channel 208, sensor 214, output 216 and valve manifold 224.

As shown in FIG. 3, stepper motor proportionally controlled bellow valve system 100 may comprise both a sensor 214 integrally connected to the valve manifold 224 at the sensor port 202, as well as an output 216 integrally connected to the valve manifold 224 at the output port 204.

In some embodiments, the unique porting of the valve manifold 224 allows the joining of two inputs, a vacuum input and a ventilation input, and their respective orifices thereby reducing the number of connection necessary in a multi-chamber setup, and allow the sharing of a vacuum pump and vent.

In some embodiments, as shown in FIG. 3, an integral sensor such as sensor 214 may be adapted to monitor the pressure within a shared output, such as an output 216. The information obtained from sensor 214 may then be used to control both the vacuum valve 302 and ventilation valve 300.

Figure 4:
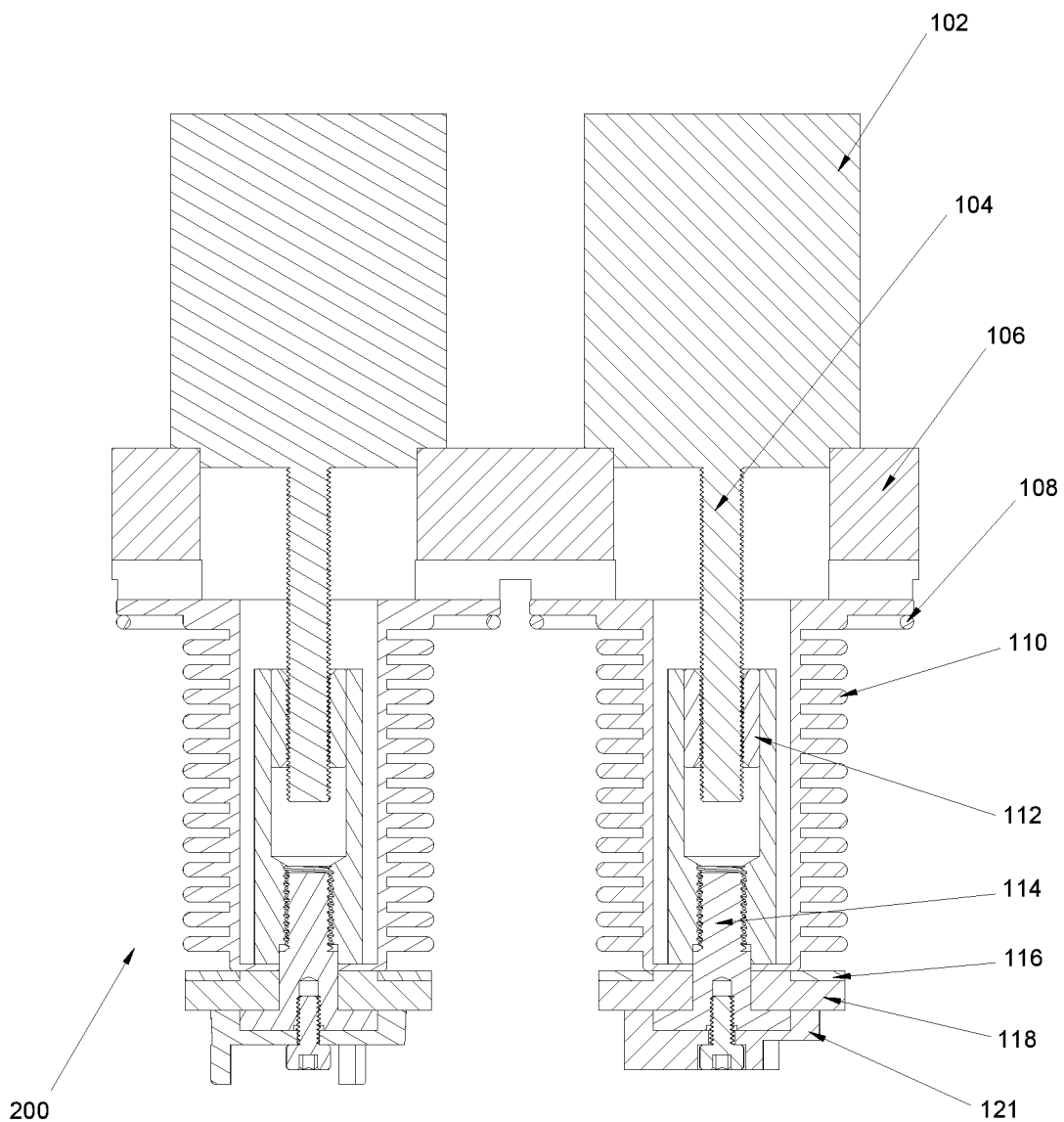
FIG. 4 is an illustration of a cross-section view of an exemplary stepper motor proportionally controlled double bellows valve in accordance with some embodiments of the present disclosure.

FIG. 4 is an illustration of a cross-section view of an exemplary stepper motor proportionally controlled double bellows valve in accordance with some embodiments of the present disclosure. As shown in FIG. 4, double bellows valve 200 may comprise: one or more stepper motors 102 each having a motor lead screw 104, a motor mounting plate 106, one or more O-rings 108, one or more bellows 110, one or more plunger adapters 112, one or more shoulder bolts 114, one or more support washers 116, one or more sealing washers 118, and one or more profile washers 120. In FIGS. 1-3, the double bellows valve 200 is shown as vacuum valve 302 and ventilation valve 300. The vacuum valve 302 is sometimes referred to as the vac bellows and the ventilation valve 300 is sometimes referred to as the bleed bellows.

Figure 5:
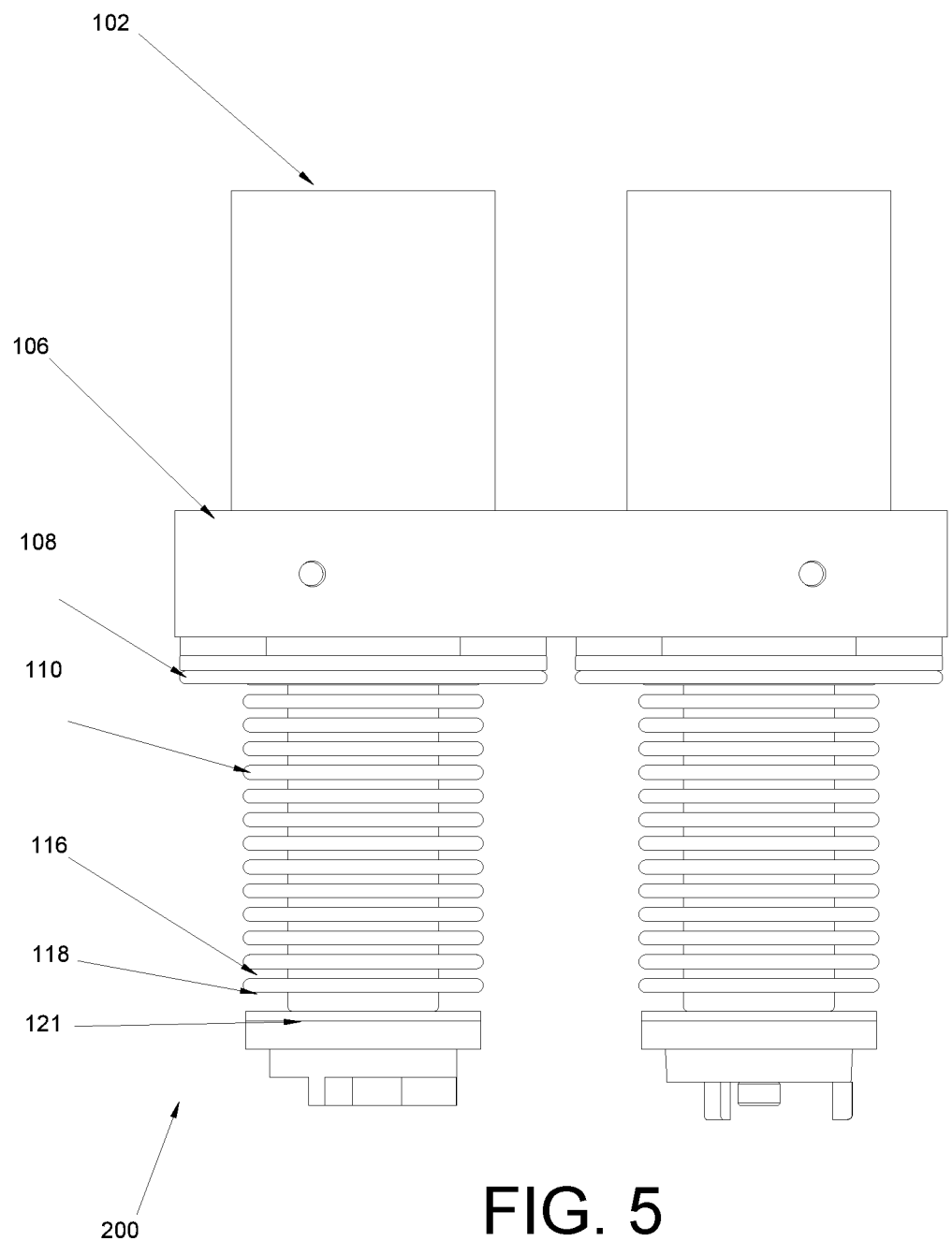
FIG. 5 is an illustration of a side view of an exemplary stepper motor proportionally controlled double bellows valve in accordance with some embodiments of the present disclosure.

FIG. 5 is an illustration of a side view of an exemplary stepper motor proportionally controlled double bellows valve in accordance with some embodiments of the present disclosure. As shown in FIG. 5, double bellows valve 200 may comprise: two stepper motors 102, a motor mounting plate 106, two O-rings 108, two bellows 110, two support washers 116, two sealing washers 118, and two profile washers 120, 121.

Figure 6:
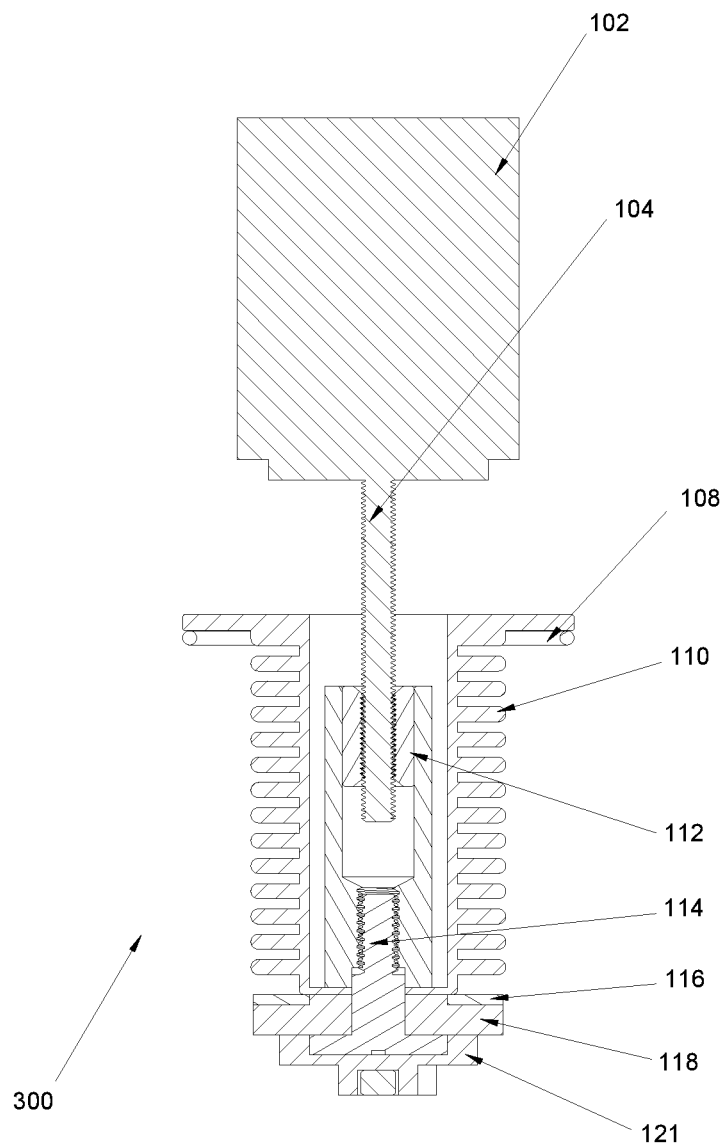
FIG. 6 is an illustration of a cross-section view of another embodiment of an exemplary stepper motor proportionally controlled bellows ventilation valve in accordance with some embodiments of the present disclosure.

FIG. 6 is an illustration of a cross-section view of another embodiment of an exemplary stepper motor proportionally controlled bellows ventilation valve in accordance with some embodiments of the present disclosure. As shown in FIG. 6, ventilation bellow valve 300 may comprise: a single stepper motor 102 having a motor lead screw 104, an O-ring 108, a bellows 110, a plunger adapter 112, a shoulder bolt 114, a support washer 116, a sealing washer 118, and a profile washer 121.

In some embodiments, as shown in FIG. 6, stepper motor proportionally controlled bellow valve system may only comprise a single proportional bellow valve rather than two proportional bellows valves. In these embodiments, there may be more plumbing required to achieve the same effect as with two proportional bellow valves working in concert.

Figure 7:
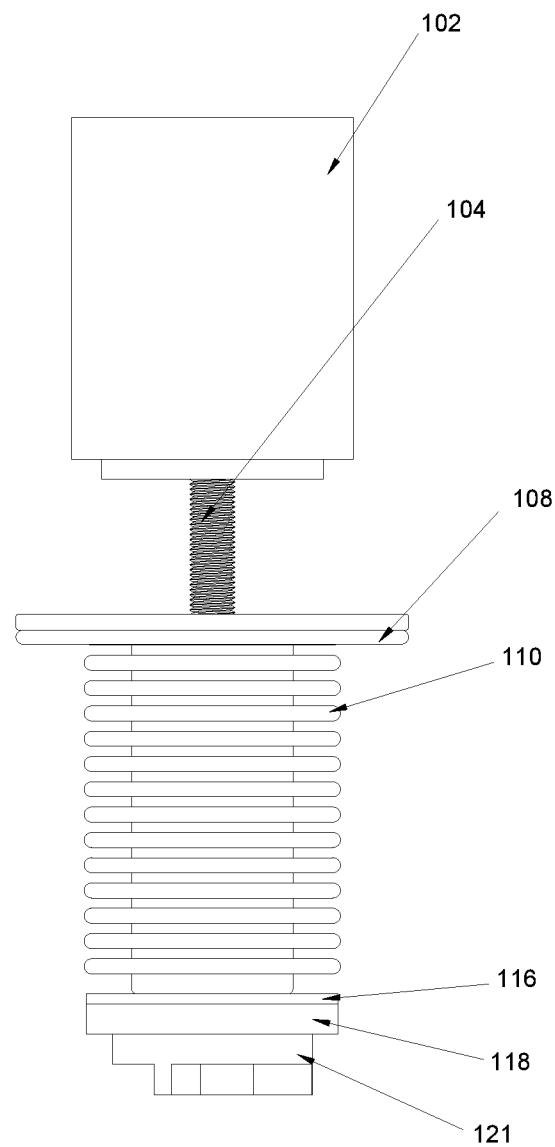
FIG. 7 is an illustration of a side view of another exemplary stepper motor proportionally controlled bellow single valve in accordance with some embodiments of the present disclosure.

FIG. 7 is an illustration of a side view of another exemplary stepper motor proportionally controlled bellow single valve in accordance with some embodiments of the present disclosure. As shown in FIG. 7, single bellow valve, in this case ventilation valve 300 may comprise: a single stepper motor 102 having a motor lead screw 104, an O-ring 108, a bellows 110, a plunger adapter 112, a shoulder bolt 114, a support washer 116, a sealing washer 118, and a profile washer 120.

Figure 8:
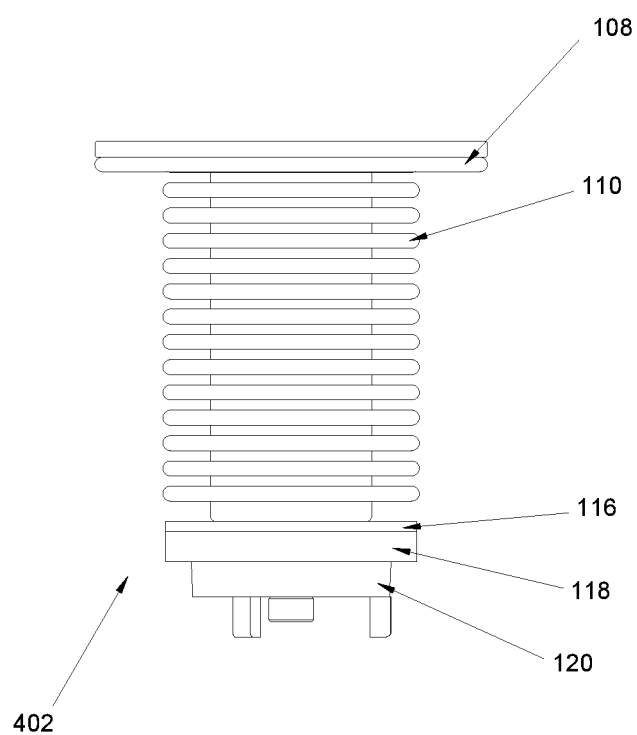
FIG. 8 is an illustration of a side view of a bellow valve, support washer, sealing washer, and profile washer in accordance with some embodiments of the present disclosure.

FIG. 8 is an illustration of a side view of a bellow valve, support washer, sealing washer, and profile washer in accordance with some embodiments of the present disclosure. As shown in FIG. 8, a valve assembly 402, which is part of the vacuum valve 302, may comprise: a bellows 110, a support washer 116, a sealing washer 118, and a profile washer 120.

Figure 9:
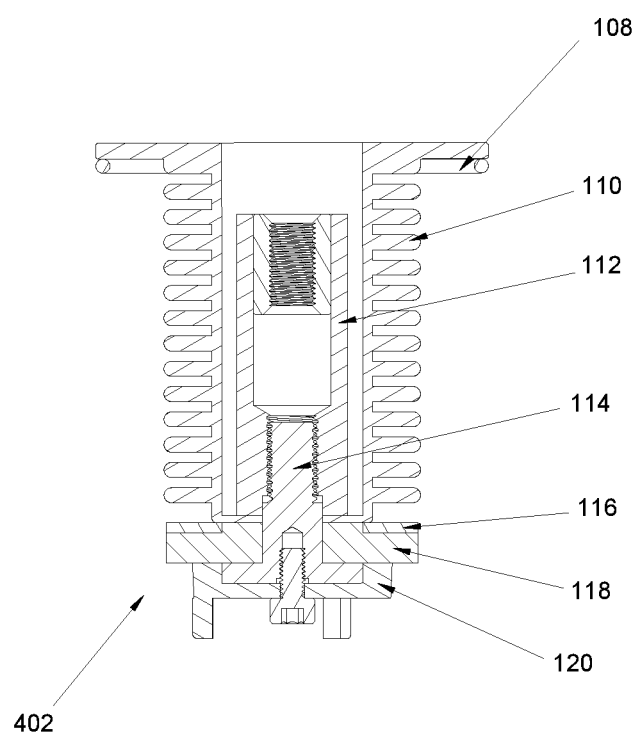
FIG. 9 is an illustration of a cross-section view of a bellow valve, plunger adapter, shoulder bolt, support washer, sealing washer, and profile washer in accordance with some embodiments of the present disclosure.

FIG. 9 is an illustration of a cross-section view of a bellow valve, plunger adapter, shoulder bolt, support washer, sealing washer, and profile washer in accordance with some embodiments of the present disclosure. As shown in FIG. 9, valve assembly 402 may comprise: a bellows 110, a plunger adapter 112, a shoulder bolt 114, a support washer 116, a sealing washer 118, and a profile washer 120. FIG. 9 shows that the profile washer is connected to the shoulder bolt via a top bolt. This makes removing and replacing the profile washer an easy task to accomplish.

Figure 10:
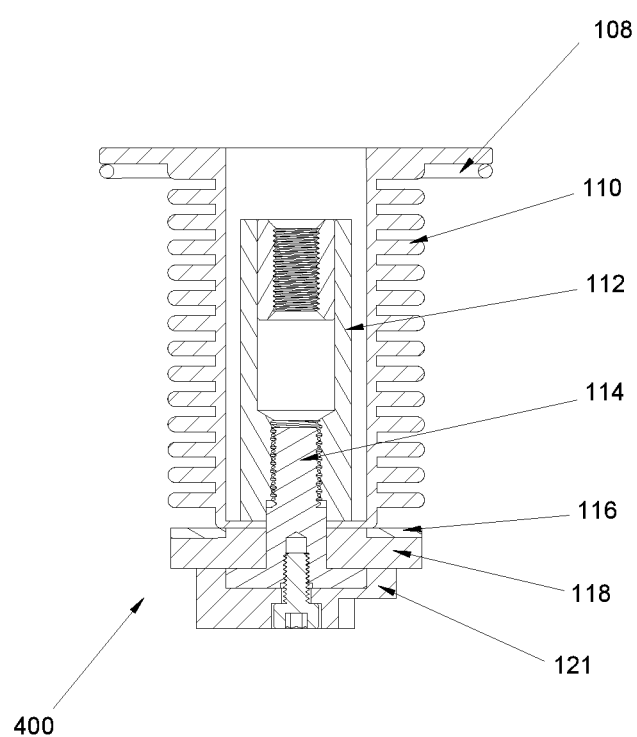
FIG. 10 is an illustration of a cross-section view of a bellow valve, plunger adapter, shoulder bolt, support washer, sealing washer, and profile washer in accordance with some embodiments of the present disclosure.

FIG. 10 is an illustration of a cross-section view of a bellow valve, plunger adapter, shoulder bolt, support washer, sealing washer, and profile washer in accordance with some embodiments of the present disclosure. As shown in FIG. 10, valve assembly 400 may comprise: a bellows 110, a plunger adapter 112, a shoulder bolt 114, a support washer 116, a sealing washer 118, and a profile washer 120.

In some embodiments, as shown in FIG. 10, profile washer 121 may be rotated or adjusted so as to change the flow profile associated with the valve assembly 400.

Figure 11:
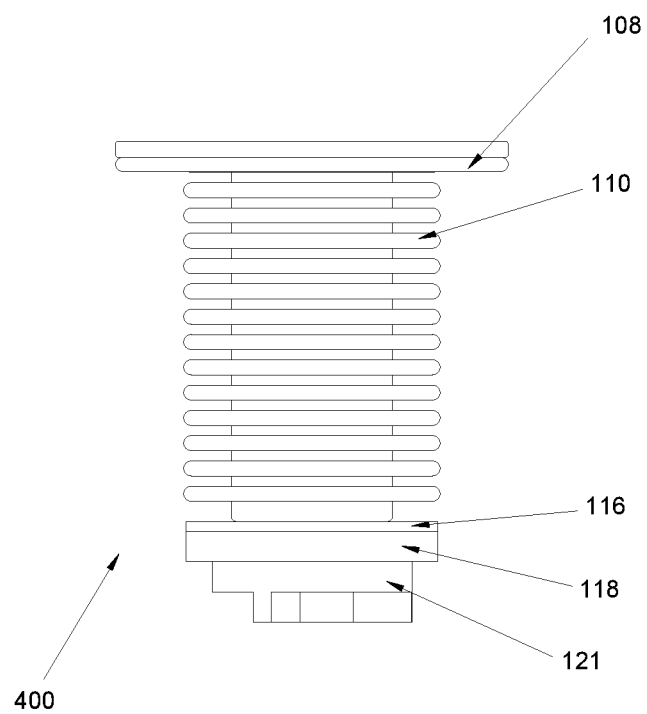
FIG. 11 is an illustration of another side view of a bellow valve, support washer, sealing washer, and profile washer in accordance with some embodiments of the present disclosure.

FIG. 11 is an illustration of another side view of a bellow valve, support washer, sealing washer, and profile washer, which is in a different position, in accordance with some embodiments of the present disclosure. As shown in FIG. 11, valve assembly 400 may comprise: a bellows 110, a support washer 116, a sealing washer 118, and a profile washer 120.

Figure 12:
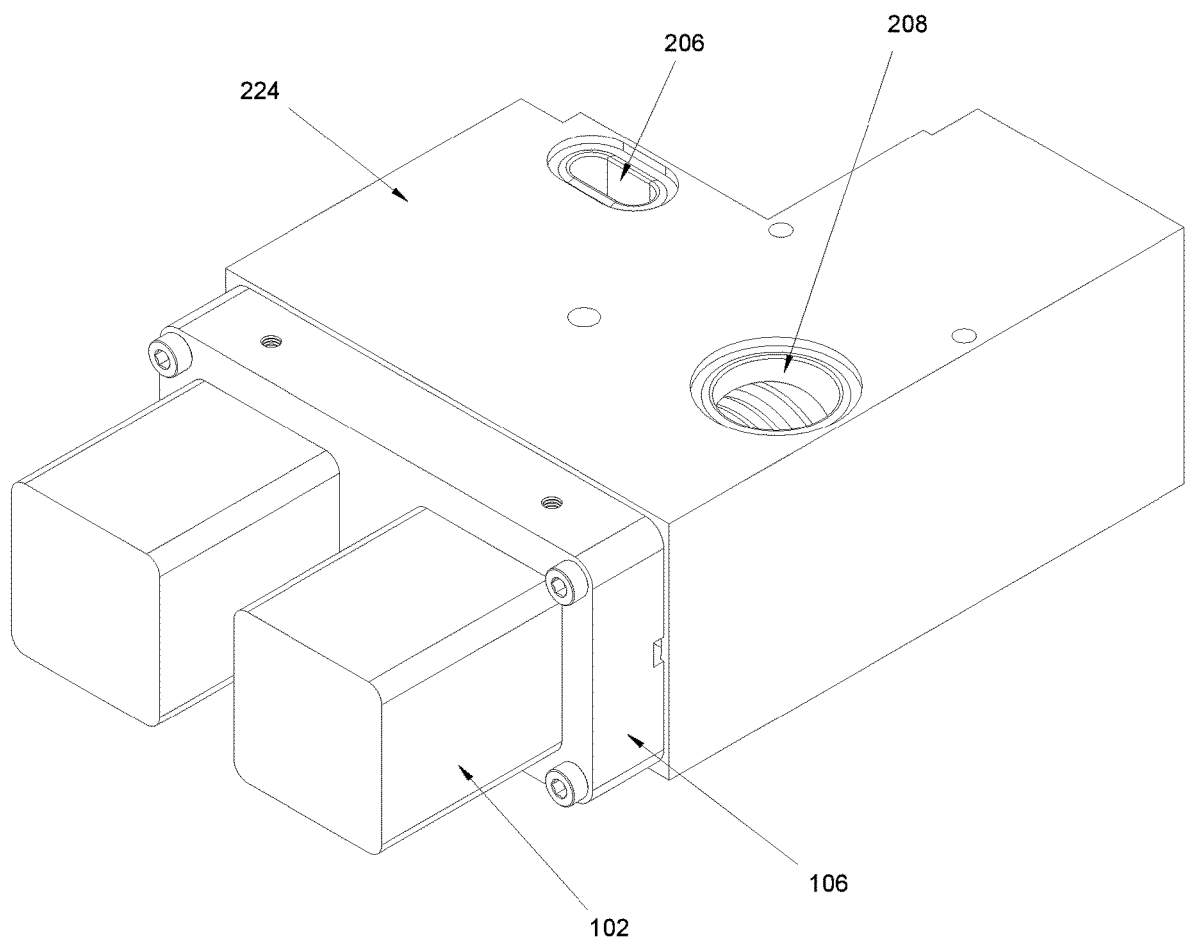
FIG. 12 is an illustration of a perspective view of an exemplary valve manifold connected to a motor mounting plate and two stepper motors, in accordance with some embodiments of the present disclosure.

FIG. 12 is an illustration of a perspective view of an exemplary valve manifold connected to a motor mounting plate and two stepper motors, in accordance with some embodiments of the present disclosure. As shown in FIG. 12, the valve manifold 224 may be securely fastened to one or more stepper motors 102 and motor mounting plate 106. FIG. 12 also shows that the ventilation channel 206 and vacuum channel 208 of the valve manifold 224 may be machined into the valve manifold 224, such that ventilation channel 206 and vacuum channel 208 form openings on the sides of the valve manifold 224.

Figure 13:
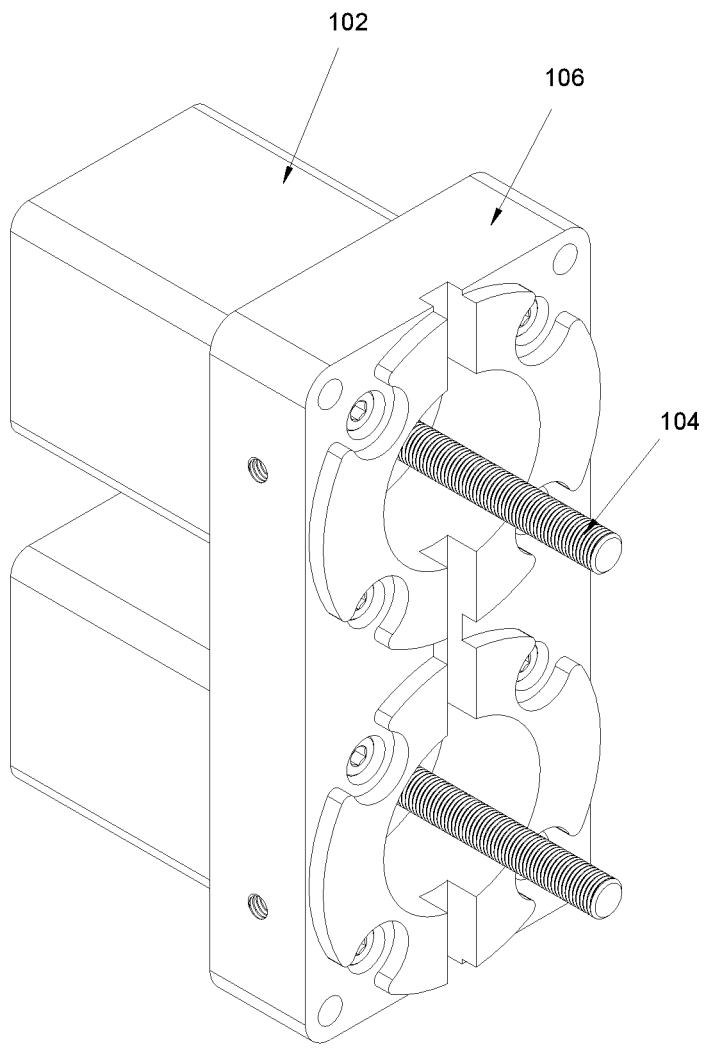
FIG. 13 is an illustration of a perspective view of a stepper motor, motor mounting plate, and motor lead screw in accordance with some embodiments of the present disclosure.

FIG. 13 is an illustration of a perspective view of a stepper motor, motor mounting plate, and motor lead screw in accordance with some embodiments of the present disclosure. As shown in FIG. 13, one or more stepper motors 102 may each comprise one or more motor lead screws 104 and may be mounted on a motor mounting plate 106.

Figure 14:
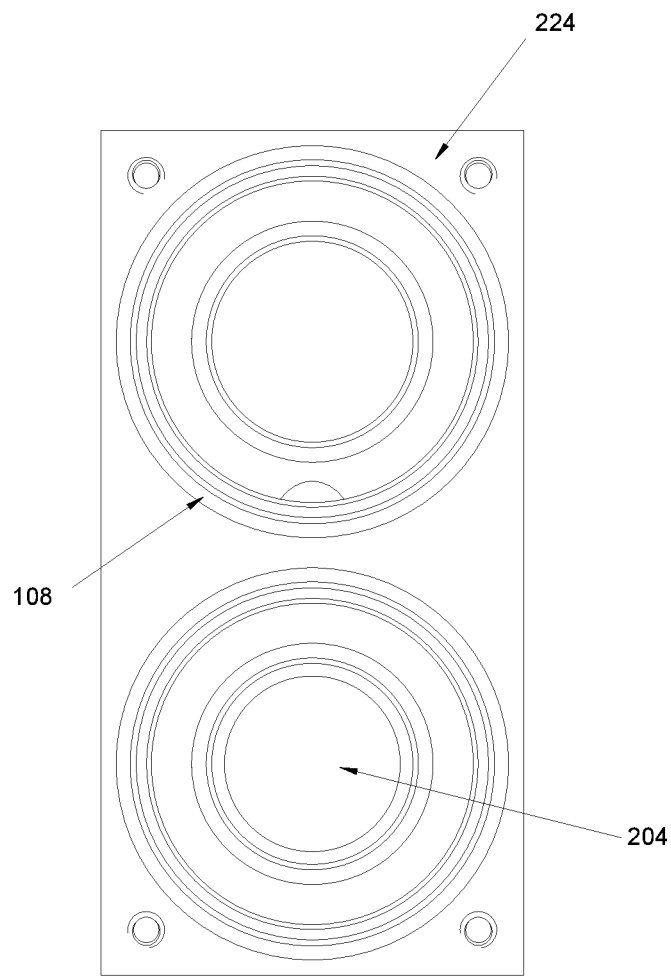
FIG. 14 is an illustration of a back view of a valve manifold with O-rings in accordance with some embodiments of the present disclosure.

FIG. 14 is an illustration of a back view of a valve manifold with O-rings in accordance with some embodiments of the present disclosure. As shown in FIG. 14, the bottom of the valve manifold 224 is configured to matingly and securely engage with the motor mounting plate 106.

Figure 15:
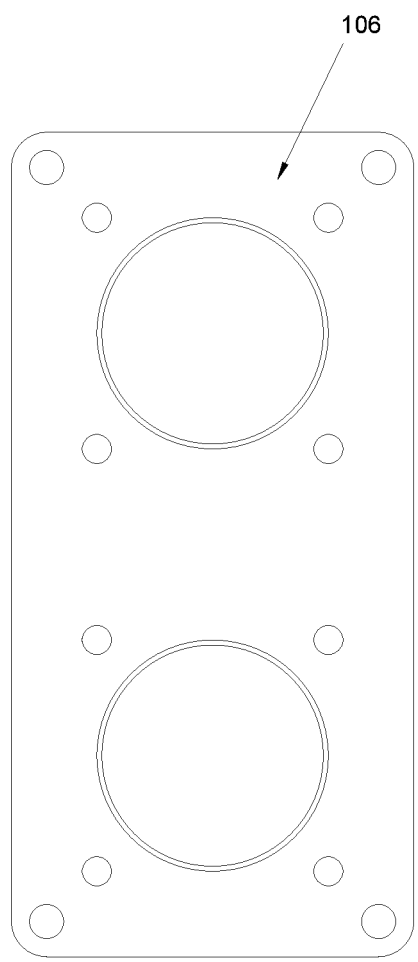
FIG. 15 is an illustration of a top view of a motor mounting plate in accordance with some embodiments of the present disclosure.

FIG. 15 is an illustration of a top view of a motor mounting plate 106 in accordance with some embodiments of the present disclosure.

Figure 16:
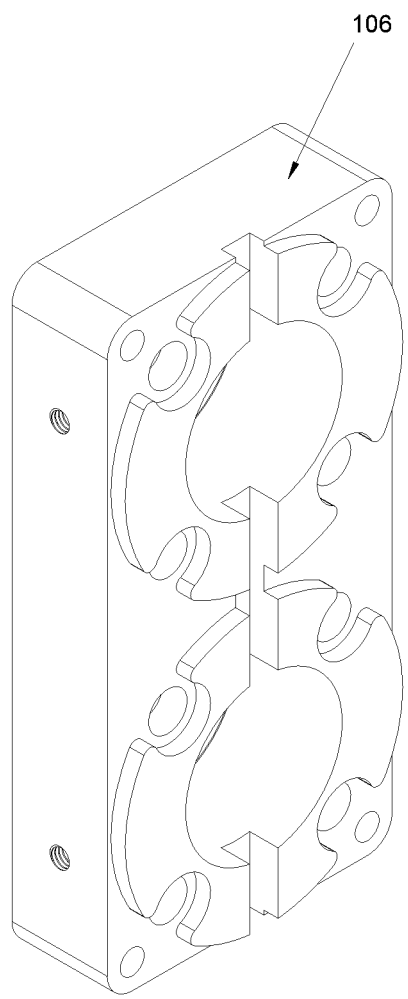
FIG. 16 is an illustration of a perspective view of a motor mounting plate in accordance with some embodiments of the present disclosure.

FIG. 16 is an illustration of a perspective view of a motor mounting plate 106 in accordance with some embodiments of the present disclosure.

Figure 17:
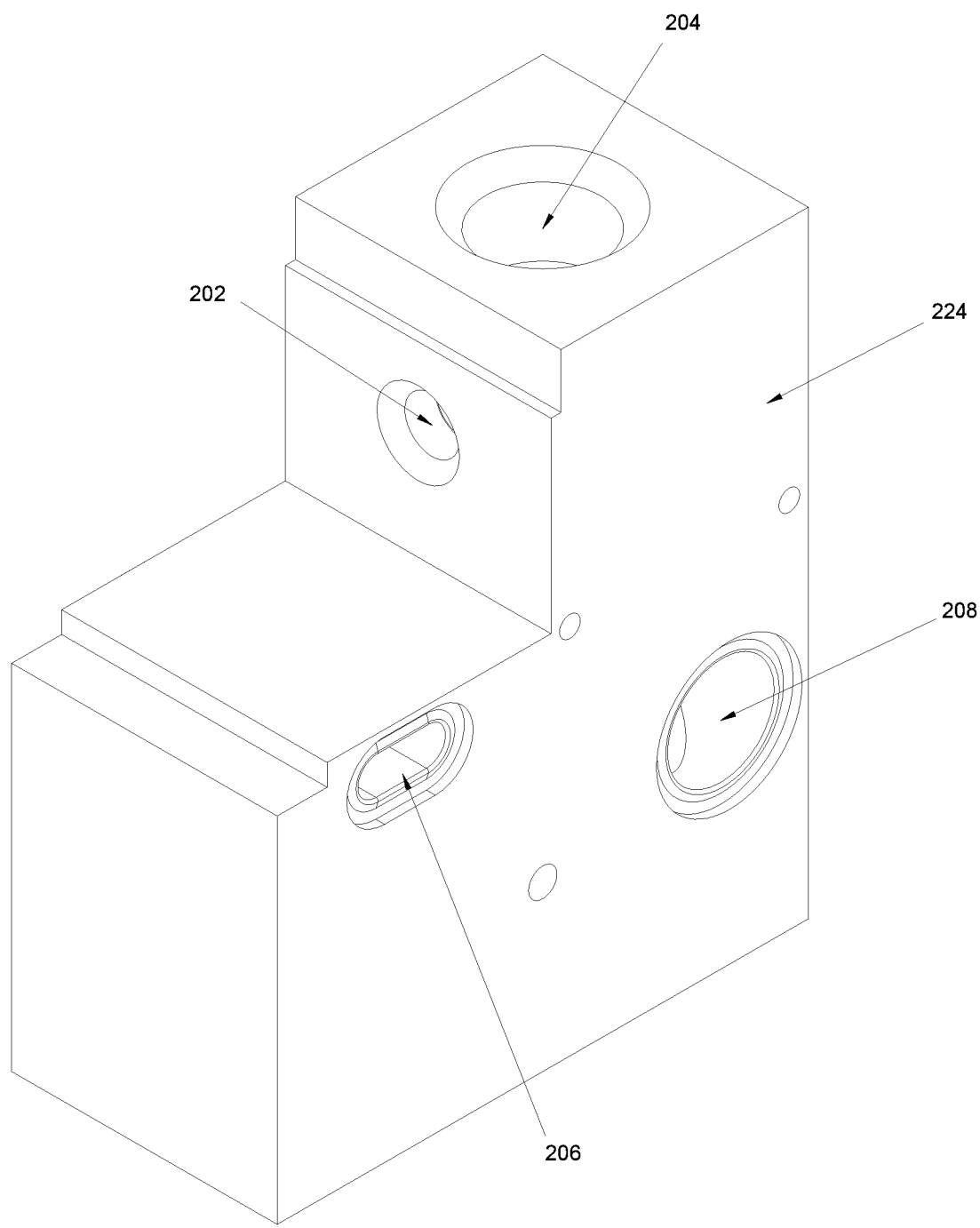
FIG. 17 is an illustration of a perspective view of a valve manifold in accordance with some embodiments of the present disclosure.

FIG. 17 is an illustration of a perspective view of a valve manifold in accordance with some embodiments of the present disclosure. As shown in FIG. 17, the valve manifold 224 may comprise a sensor port 202, an output port 204, a ventilation channel 206, and a vacuum channel 208. In some embodiments, as shown in FIG. 17, the sensor port 202, output port 204, ventilation channel 206, and vacuum channel 208 may be machined into the valve manifold 224 such that sensor port 202, output port 204, ventilation channel 206 and vacuum channel 208 form openings into the valve manifold 224. One or more components may be adaptively connected to engage with these opening. For example, an integrative sensor such as sensor 214 from FIG. 1 may be adapted to connect to sensor port 202. An output such as output 216 from FIG. 3 may be adapted to connect to output port 204.

Figure 18:
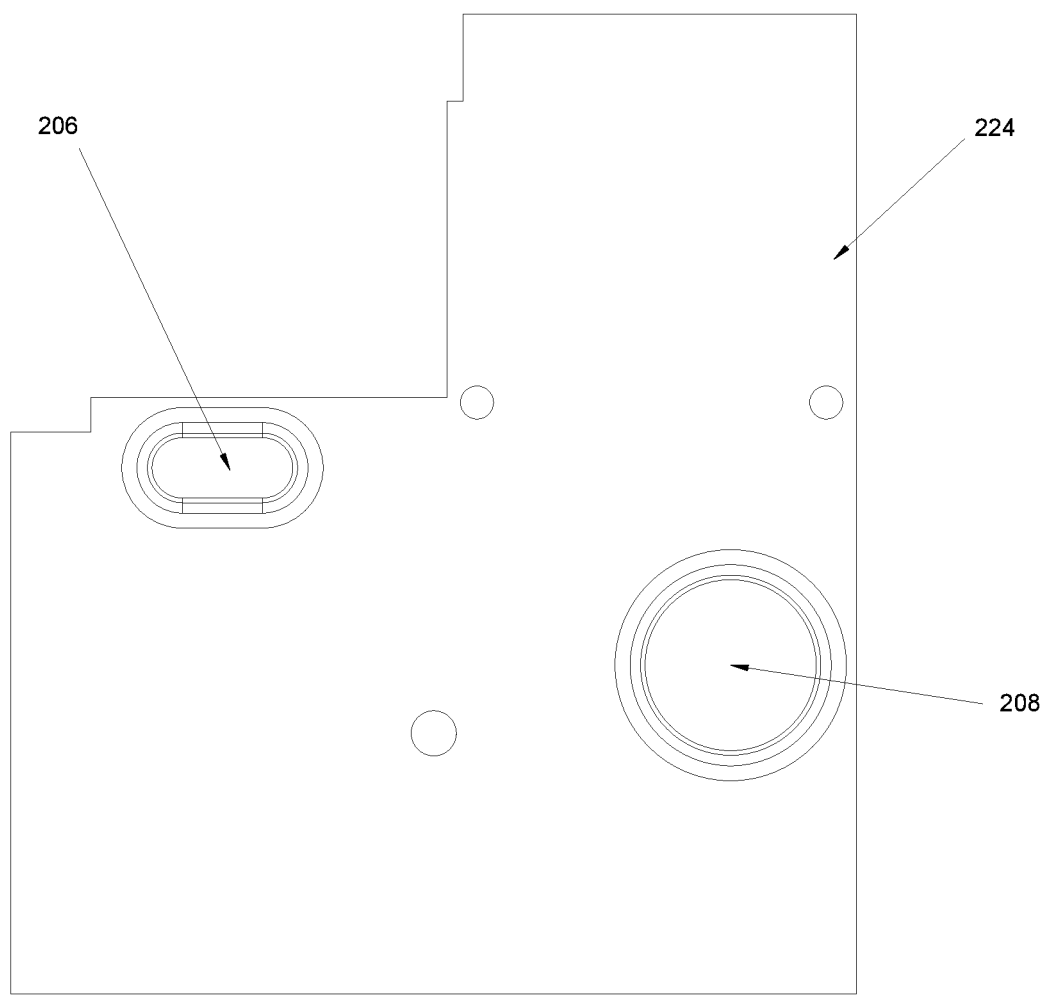
FIG. 18 is an illustration of a side view of a valve manifold without O-rings in accordance with some embodiments of the present disclosure.

FIG. 18 is an illustration of a side view of a valve manifold without O-rings in accordance with some embodiments of the present disclosure. As shown in FIG. 18, the valve manifold 224 may comprise a ventilation channel 206 and a vacuum channel 208.

Figure 19:
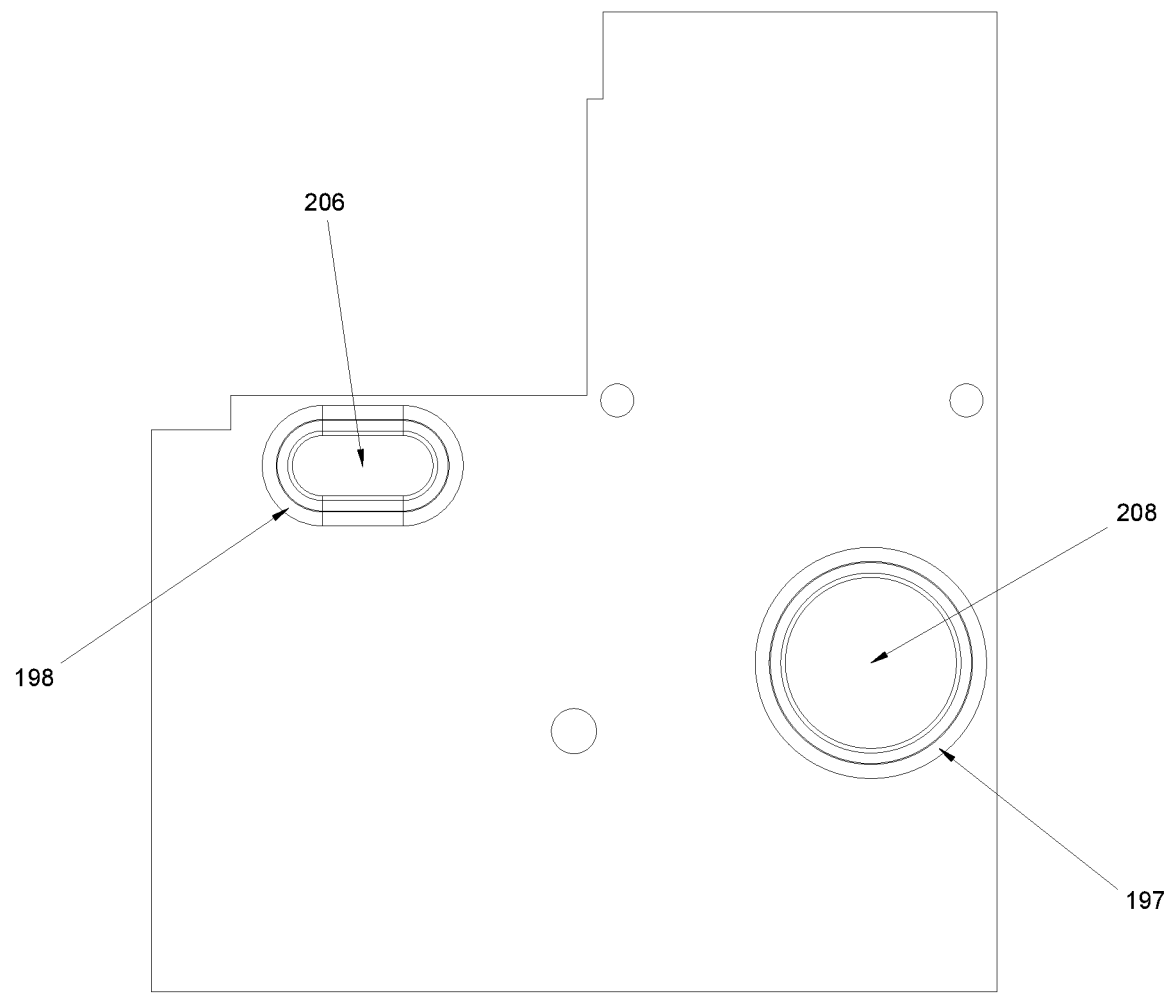
FIG. 19 is an illustration of a left side view of a valve manifold with O-rings in accordance with some embodiments of the present disclosure.

FIG. 19 is an illustration of a left side view of a valve manifold with O-rings in accordance with some embodiments of the present disclosure. As shown in FIG. 19, the valve manifold 224 may comprise a ventilation channel 206 and a vacuum channel 208 that may be connected to O-rings 198, 197, respectively. The O-rings 198, 197 assist in forming an airtight seal when the valve manifold is connected to an end plate or an input manifold.

Figure 20:
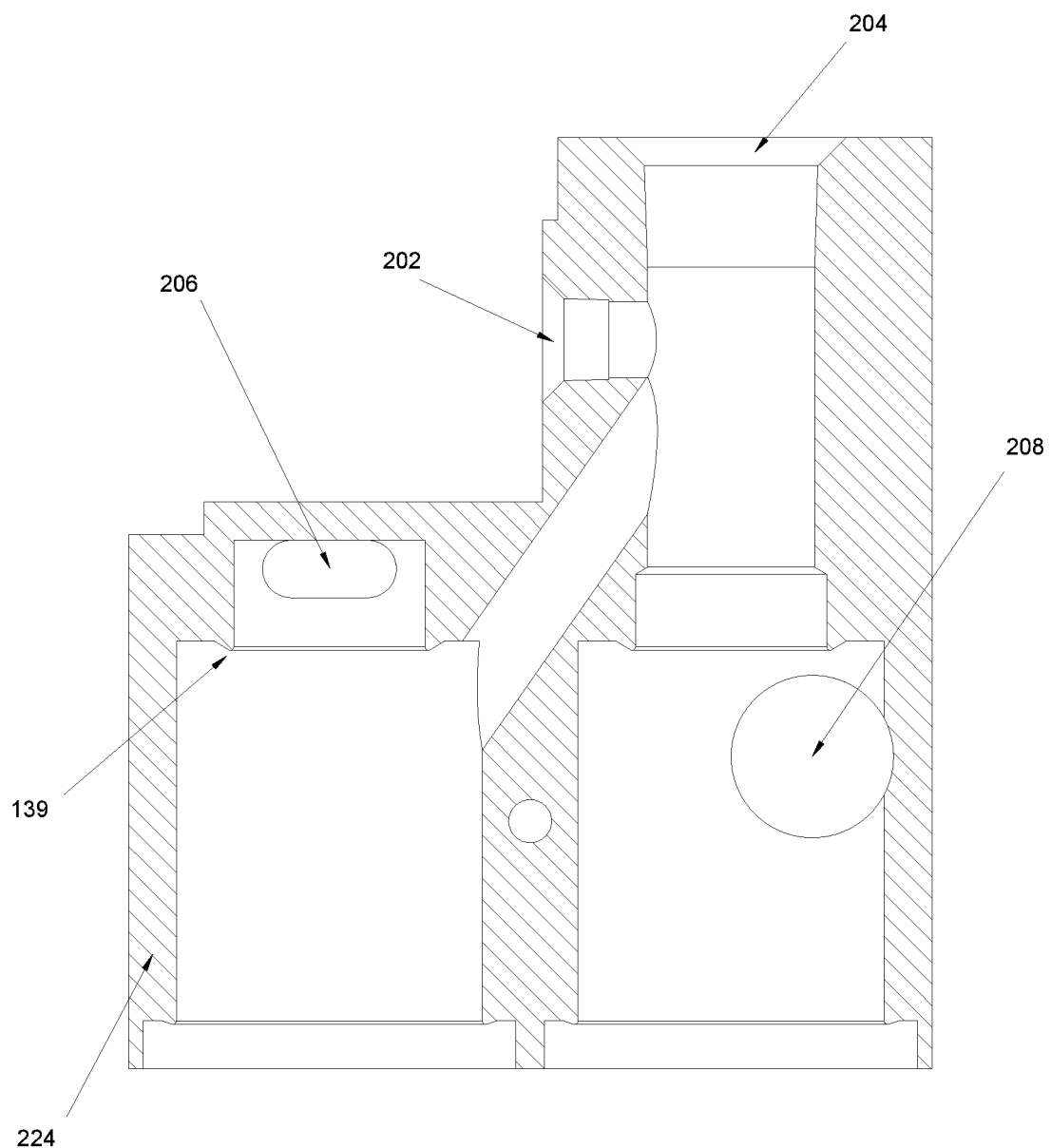
FIG. 20 is an illustration of a cross-section view of a valve manifold in accordance with some embodiments of the present disclosure.

FIG. 20 is an illustration of a cross-section view of a valve manifold in accordance with some embodiments of the present disclosure. As shown in FIG. 20, the valve manifold 224 may comprise a sensor port 202, an output port 204, a ventilation channel 206, a vacuum channel 208, and orifice rim 139.

Figure 21:
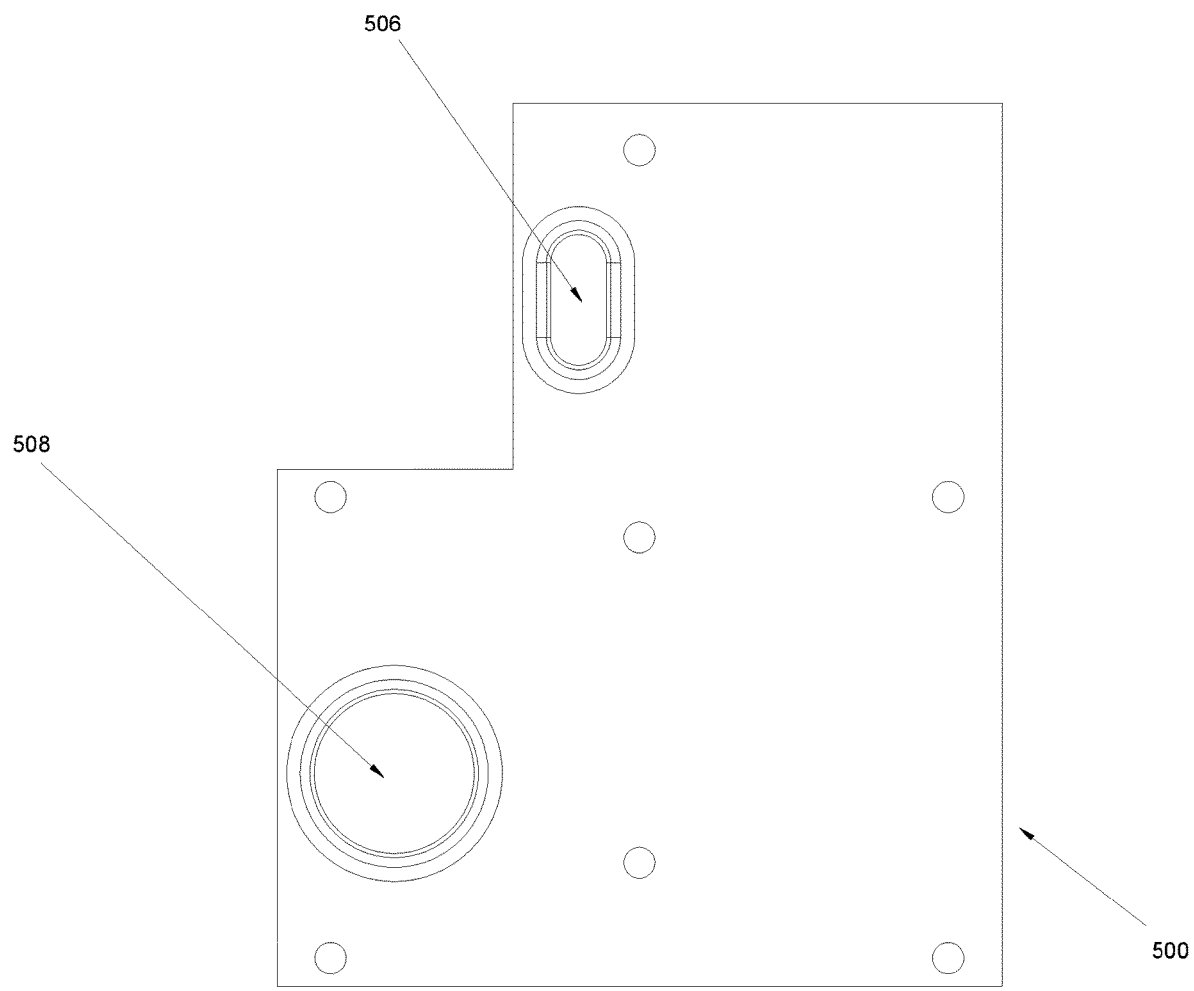
FIG. 21 is an illustration of a side view of an input manifold without O-rings in accordance with some embodiments of the present disclosure.

FIG. 21 is an illustration of a side view of an input manifold without O-rings in accordance with some embodiments of the present disclosure. As shown in FIG. 21, the input manifold 500 may comprise a ventilation channel 506 and a vacuum channel 508. The input manifold 500 may be configured to matingly engage with valve manifold, such that the ventilation channels 206 and 506 line up and for a continuous channel and such that the vacuum channels 208 and 508 line up and for a continuous channel.

Figure 22:
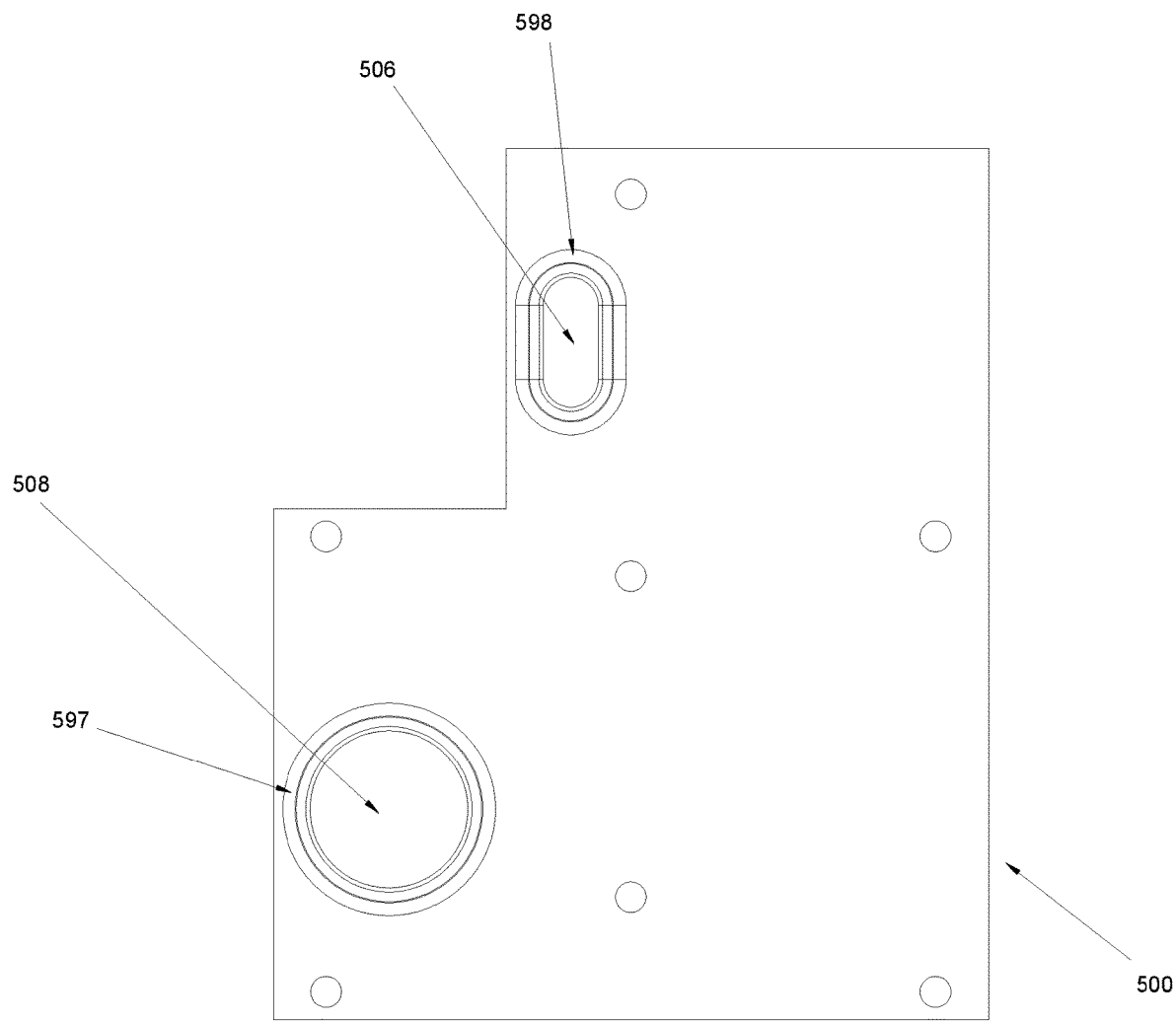
FIG. 22 is an illustration of a left side view of an input manifold with O-rings in accordance with some embodiments of the present disclosure.

FIG. 22 is an illustration of a left side view of an input manifold with O-rings in accordance with some embodiments of the present disclosure. As shown in FIG. 22, the input manifold 500 may comprise a ventilation channel 506, which may have an O-ring 598, and vacuum channel 508, which may have an O-ring 597. The O-rings 598, 597 assist in forming an airtight seal when the input manifold 500 is connected to an end plate or a valve manifold.

Figure 23:
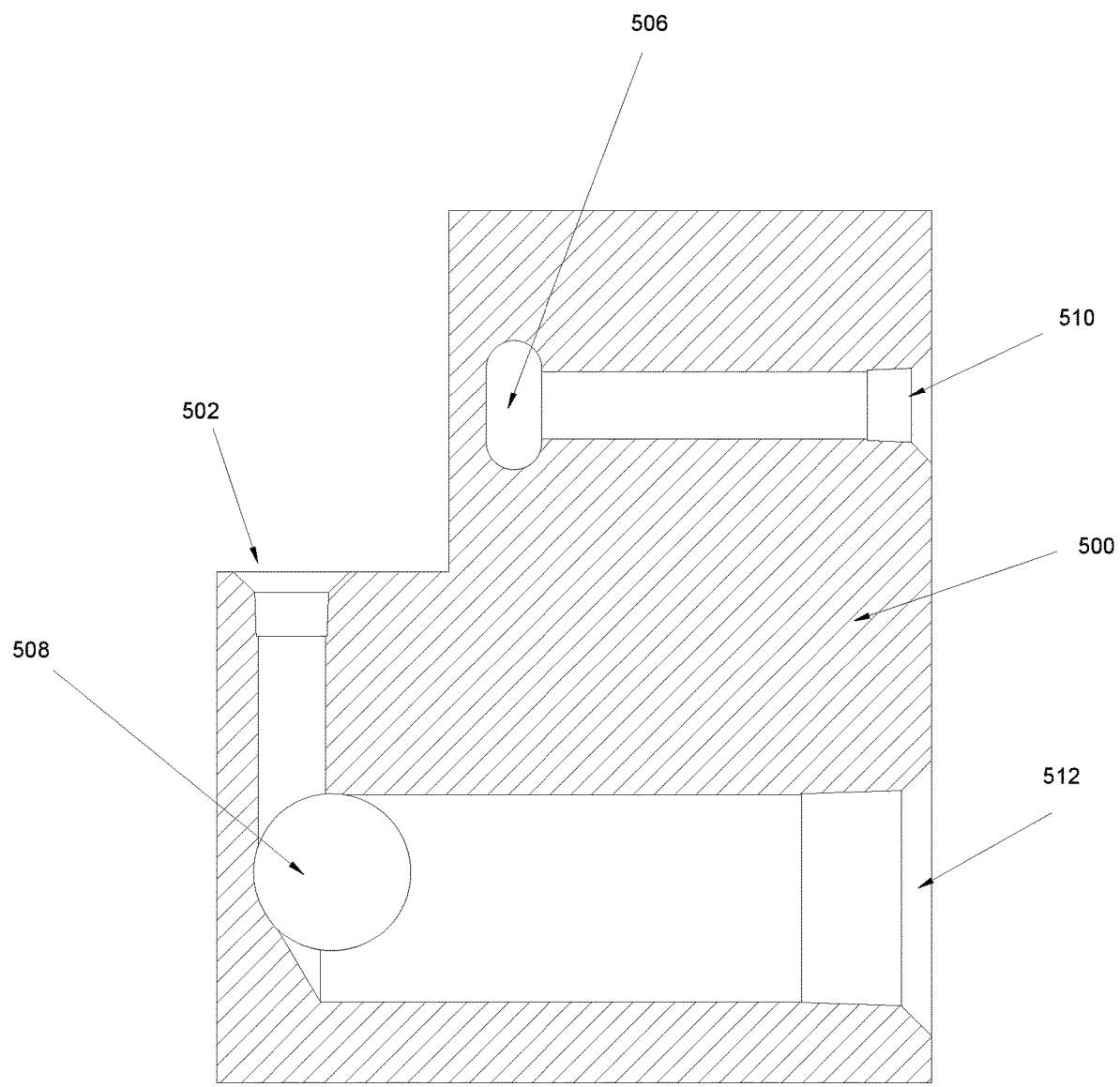
FIG. 23 is an illustration of a cross-section view of an input manifold in accordance with some embodiments of the present disclosure.

FIG. 23 is an illustration of a cross-section view of an input manifold in accordance with some embodiments of the present disclosure. As shown in FIG. 23, the input manifold 500 may comprise a sensor port 502, vacuum port 512, ventilation channel 506, vacuum channel 508, and ventilation port 510.

Figure 24:
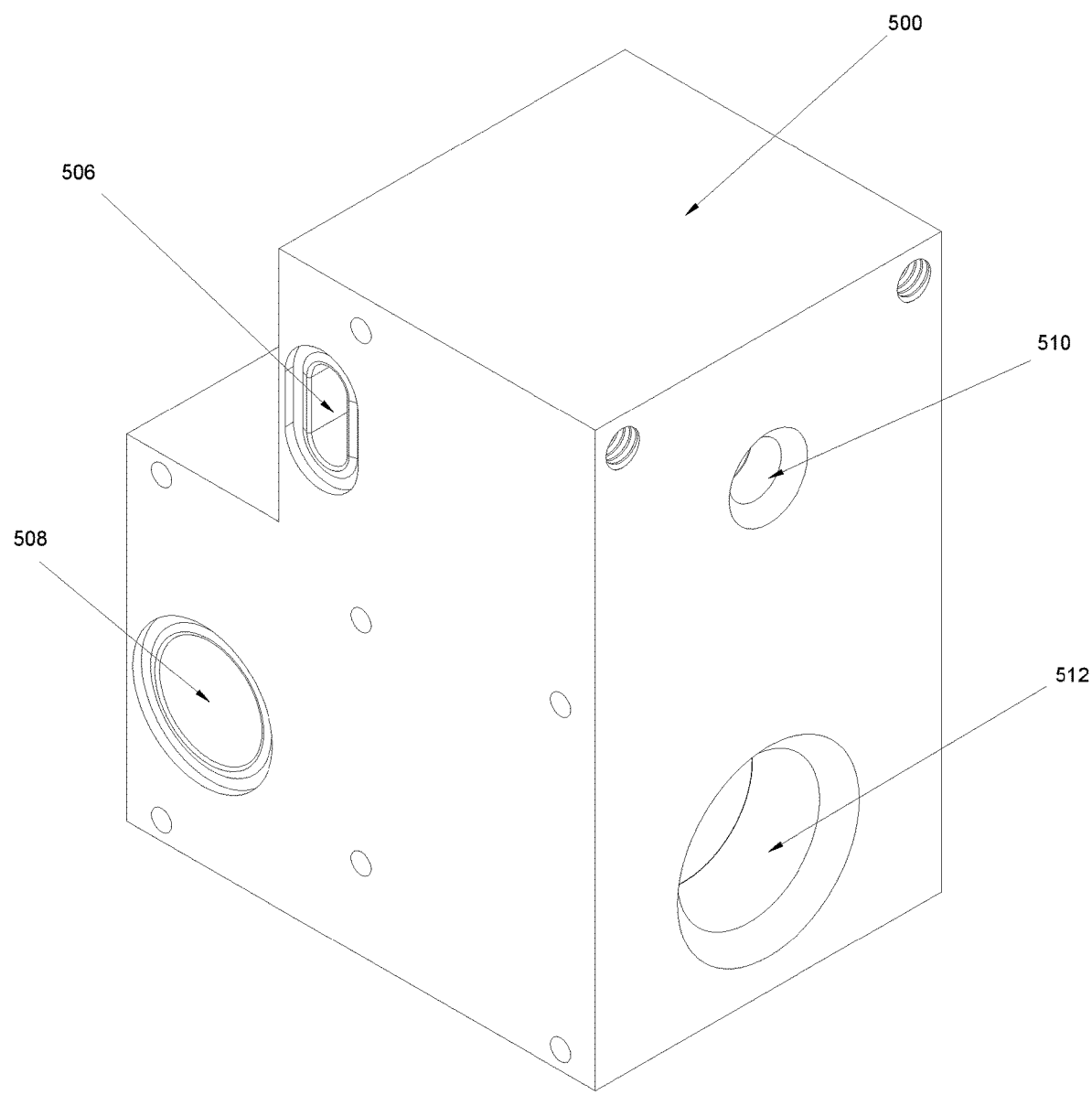
FIG. 24 is an illustration of a perspective view of an input manifold in accordance with some embodiments of the present disclosure.

FIG. 24 is an illustration of a perspective view of an input manifold in accordance with some embodiments of the present disclosure. As shown in FIG. 24, the input manifold 500 may comprise the sensor port 502, ventilation channel 506, vacuum channel 508, ventilation port 510, and vacuum port 512. In some embodiments, as shown in FIGS. 24 and 25, the ventilation channel 506 and vacuum channel 508 may perpendicularly cross, respectively, the ventilation port 510 and vacuum port 512 respectively.

Figure 25:
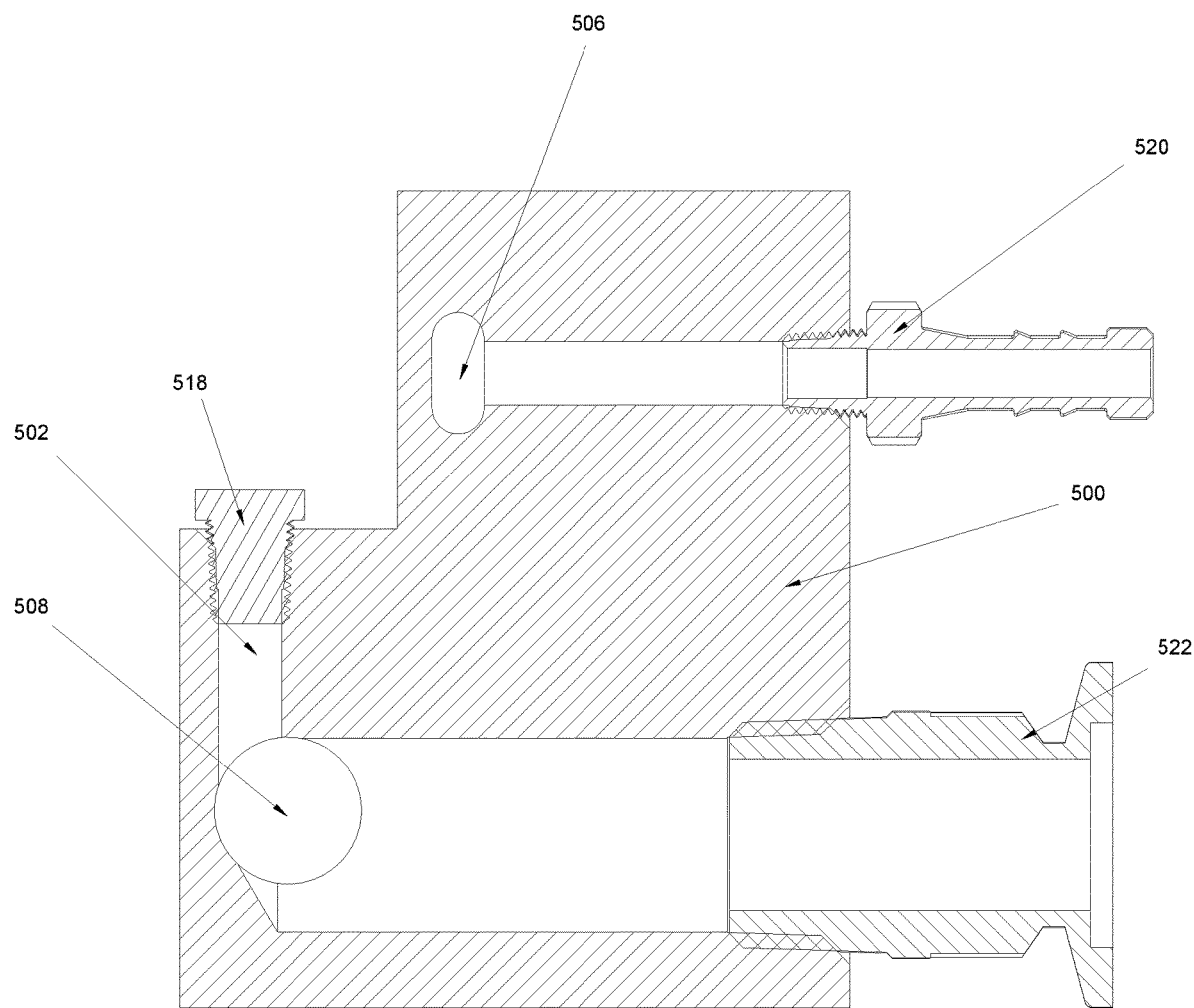
FIG. 25 is an illustration of a cross-section view of an exemplary input manifold with a ventilation input, vacuum input, and a sensor port plug in accordance with some embodiments of the present disclosure.

FIG. 25 is an illustration of a cross-section view of an exemplary input manifold with a ventilation input, vacuum input, and a sensor port plug in accordance with some embodiments of the present disclosure. As shown in FIG. 25, the input manifold 500 may comprise a sensor port 502, ventilation channel 506, vacuum channel 508, sensor port plug 218, ventilation input 520, and vacuum input 522. In some embodiments, a sensor may be put in the sensor port 502.

Figure 26:
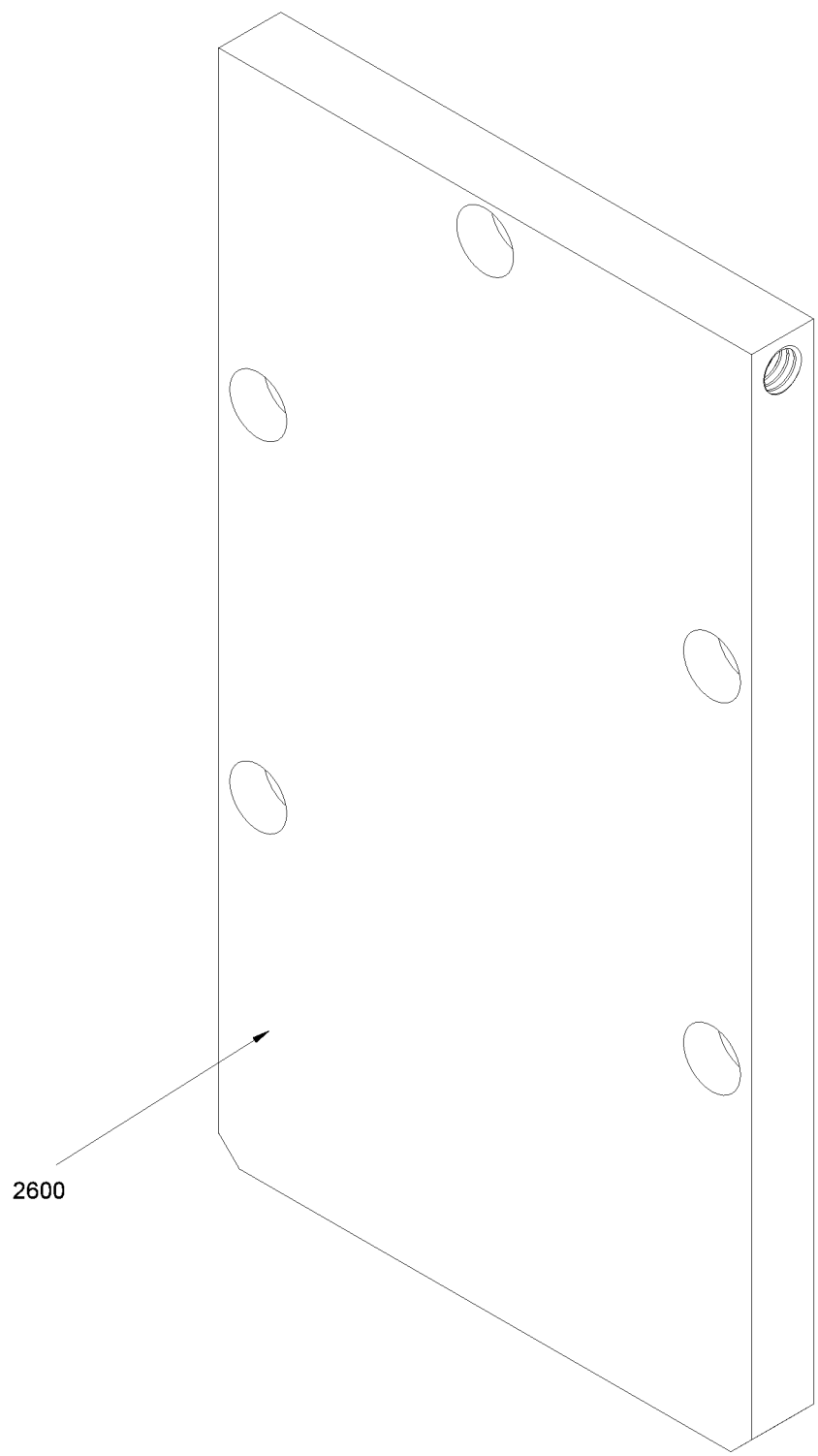
FIG. 26 is an illustration of a perspective view of an endplate in accordance with some embodiments of the present disclosure.

FIG. 26 is an illustration of a perspective view of an endplate in accordance with some embodiments of the present disclosure. The endplate 2600 may be configured to matingly secure to the side of a valve manifold and/or to the side of an input manifold.

Figure 27:
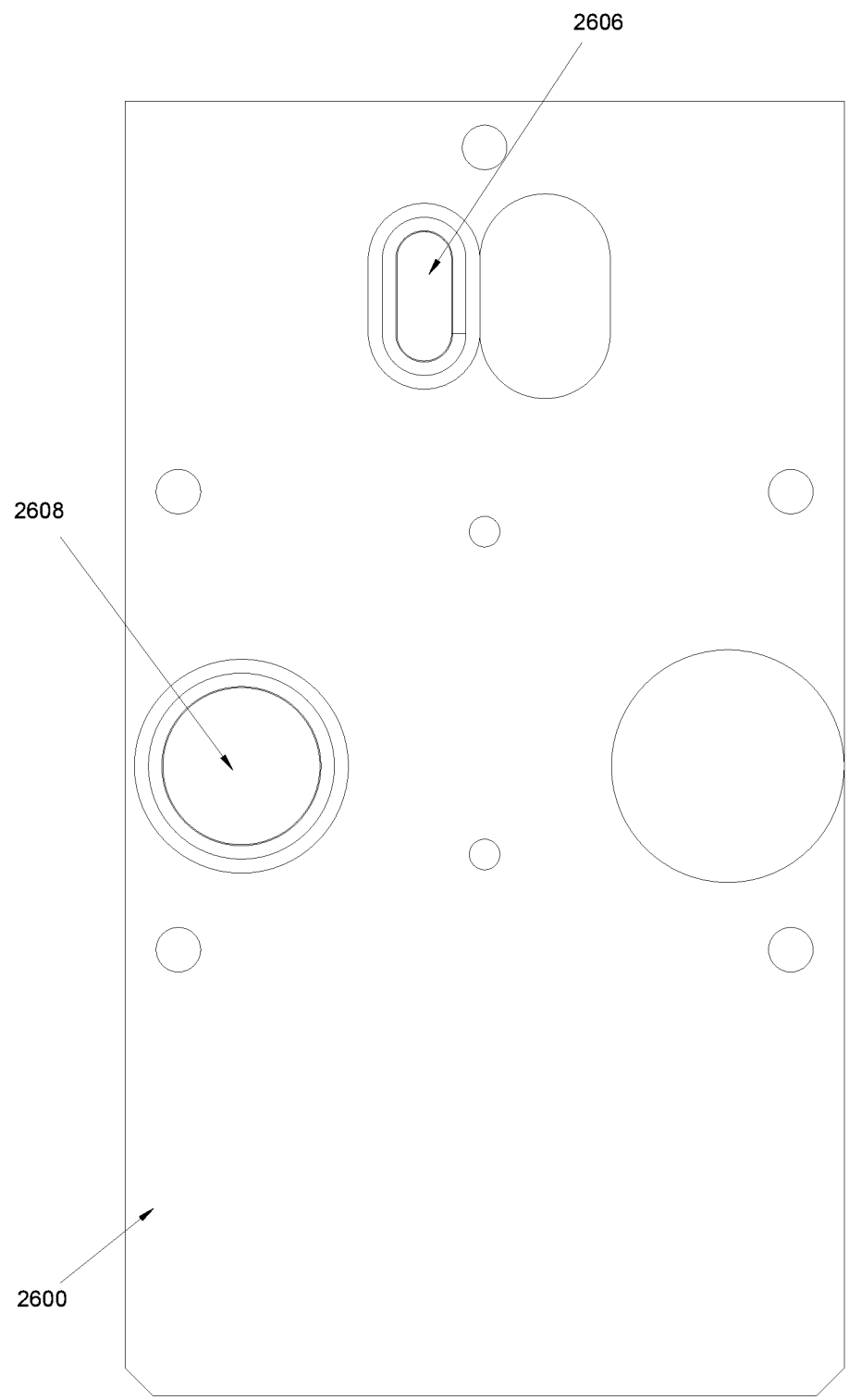
FIG. 27 is an illustration of a side view of an endplate without O-rings in accordance with some embodiments of the present disclosure.

FIG. 27 is an illustration of a side view of an endplate without O-rings in accordance with some embodiments of the present disclosure. A ventilation portion 2606 is configured to matingly engage with and sealingly cap the ventilation channels 206, 506. The vacuum portion 2608 may be configured to matingly engage with and sealingly cap the vacuum channels 208, 508.

Figure 28:
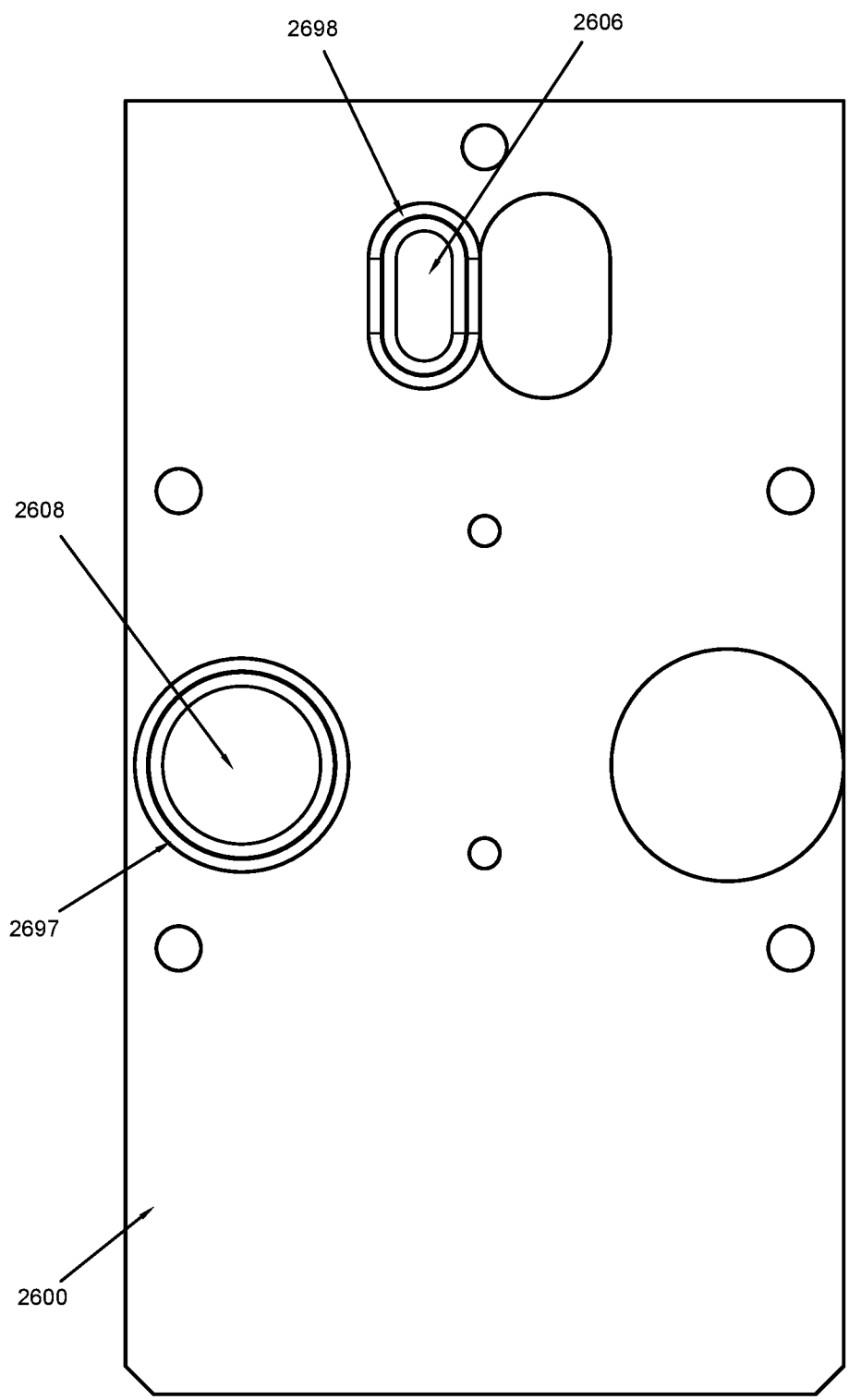
FIG. 28 is an illustration of a side view of an endplate with O-rings in accordance with some embodiments of the present disclosure.

FIG. 28 is an illustration of a side view of an endplate with O-rings in accordance with some embodiments of the present disclosure. The endplate 2600 may be configured to matingly secure to the side of a valve manifold and/or to the side of an input manifold. The ventilation portion 2606, with the O-ring 2698, may be configured to matingly engage with and sealingly cap the ventilation channels 206, 506. The vacuum portion 2608, with the O-ring 2697, may be configured to matingly engage with and sealingly cap the vacuum channels 208, 508.

Figure 29:
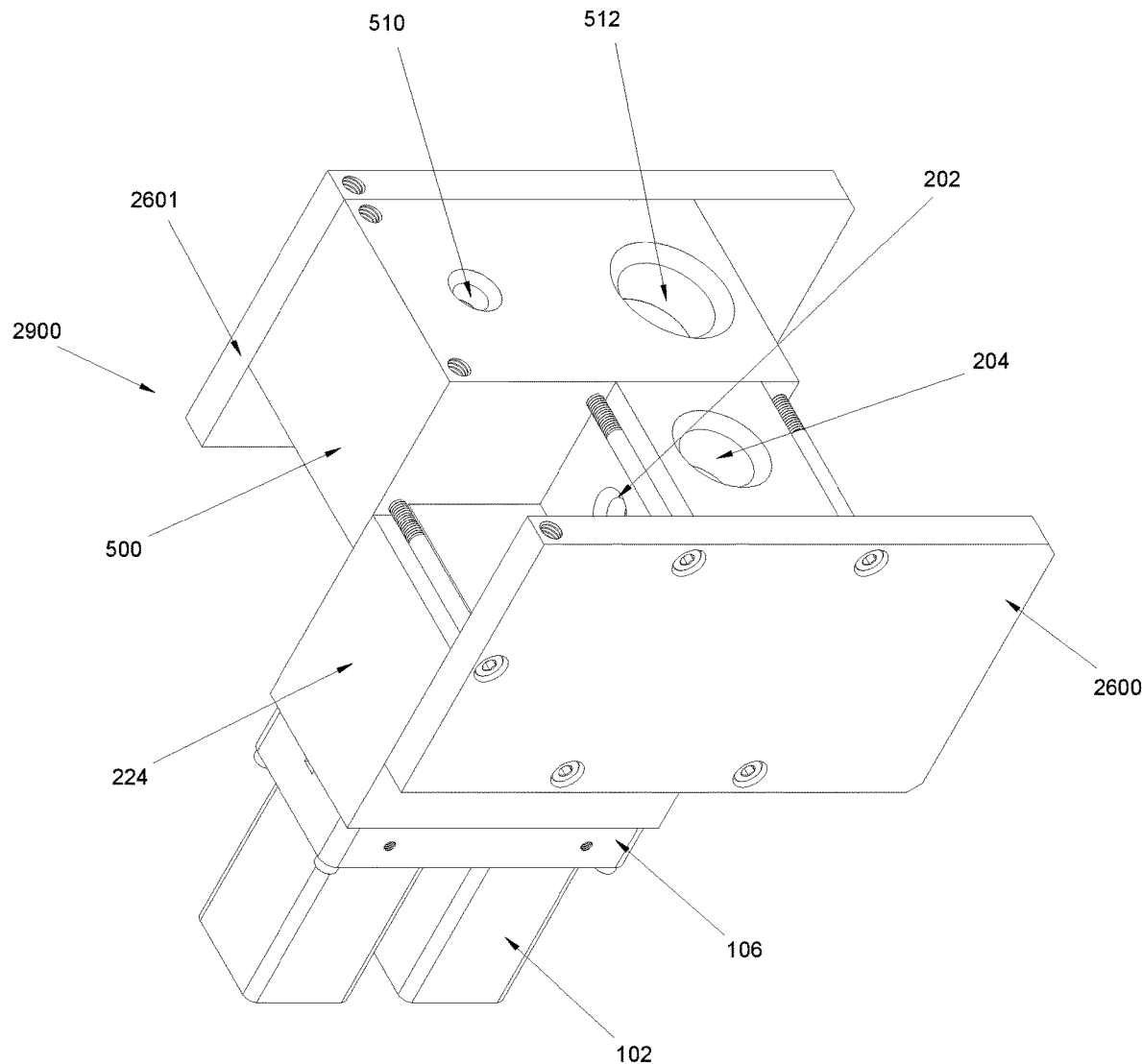
FIG. 29 is an illustration of a perspective view of an exemplary stepper motor proportionally controlled bellows double valve system that is connected to two endplates and an input manifold, in accordance with some embodiments of the present disclosure.

FIG. 29 is an illustration of a perspective view of an exemplary stepper motor proportionally controlled bellows double valve system that is connected to two endplates and an input manifold, in accordance with some embodiments of the present disclosure. As shown in FIG. 29, the system 2900 may comprise the valve manifold 224, which may be matingly secured to, via bolts, although other securing mechanisms may be used, the endplate 2600 and input manifold 500. The valve manifold 224 is shown comprising the dual stepper motors 102, motor mounting plate 106, and output port 204. The input manifold 500 is shown as secured to the valve manifold 224 and an end plate 2601. The ventilation port 510 may allow passage to the ventilation channel. The vacuum port 512 may allow passage to the vacuum channel.

Although the input manifold is shown as a separate device, it should be understood that in some embodiments, the valve manifold may include the parts of the input manifold, such that a separate input manifold is not necessary.

FIG. 30 is an illustration of a perspective view of an exemplary stepper motor proportionally controlled bellows double valve system that is connected to two endplates and an input manifold, in accordance with some embodiments of the present disclosure. As shown in FIG. 30, the system 2900 may comprise the valve manifold 224, which may matingly secure to, via bolts, the endplate 2600 and input manifold 500. The valve manifold 224 is shown comprising dual stepper motors 102, motor mounting plate 106, and output 217. The input manifold 500 is shown as secured to the valve manifold 224 and the end plate 2601. The ventilation input 520 may be connected to a tank of gas or may simply allow passage of ambient air to the ventilation channel. The vacuum input 522 may be connected to a vacuum pump, which may provide vacuum pressure to a device that is connected to output 217. The vacuum may be allowed passage via the vacuum channel. The user device that requires the vacuum receives the vacuum when the vacuum valve 302 is cracked open. The valve 302 is able to precisely control the amount of vacuum pressure put through to the user device.

In some embodiments, the vacuum valve 302 and the ventilation valve 300 may be opened at the same time to provide unique pressure regulation on a user device that is attached to the output port 204/output 217, 216.

FIG. 31 is an illustration of a front view of an exemplary stepper motor proportionally controlled bellows double valve system that is connected to two endplates and an input manifold, in accordance with some embodiments of the present disclosure. As shown in FIG. 31, the system 2900 may comprise the valve manifold 224, which may be matingly secured to, via bolts, the endplate 2600 and input manifold 500. The valve manifold 224 is shown comprising output 217. Input manifold 500 is shown as secured to the valve manifold 224 and the end plate 2601 and having ventilation input 520 and vacuum input 522.

Figure 32:
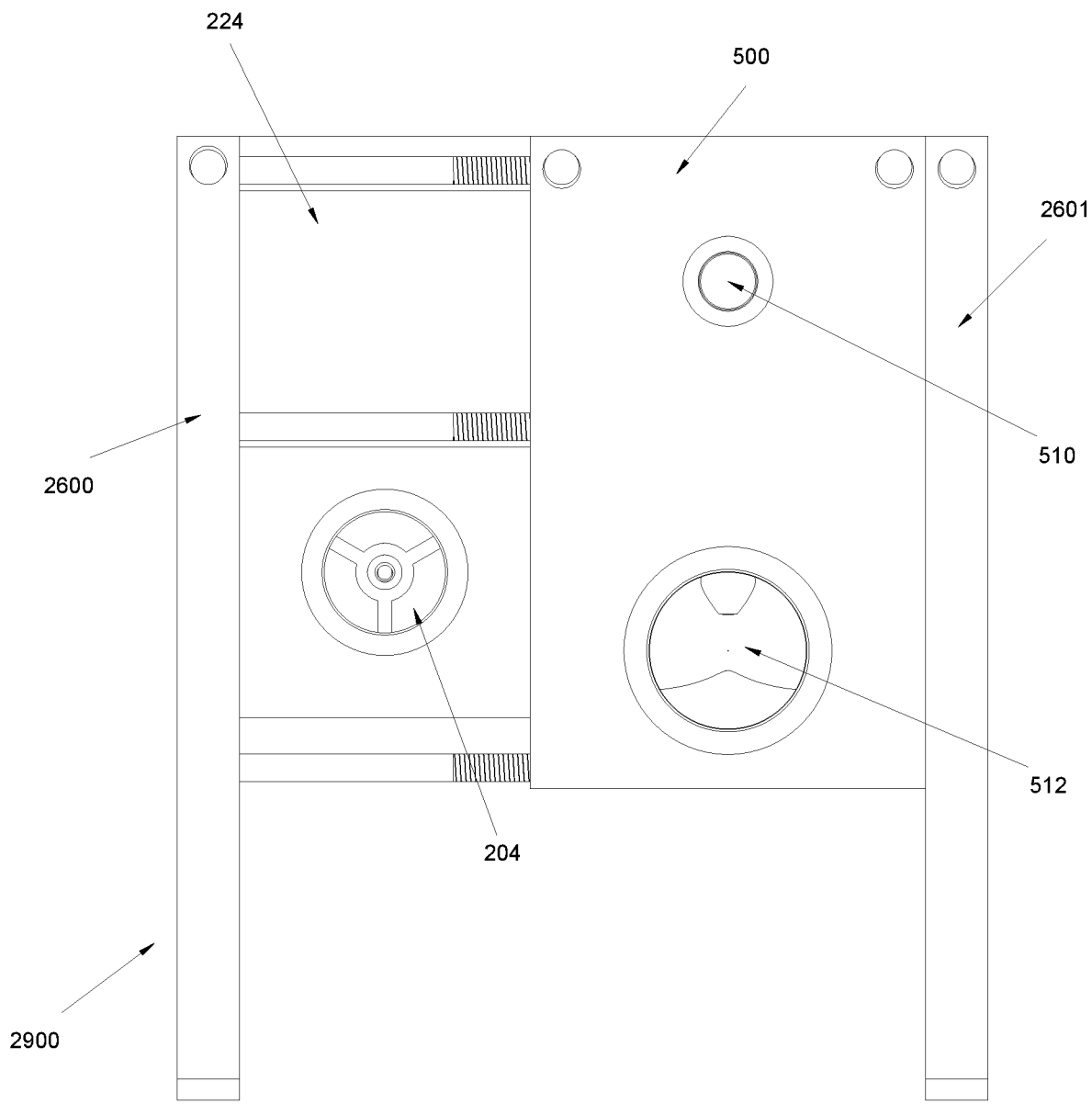
FIG. 32 is an illustration of a front view of an exemplary stepper motor proportionally controlled bellows double valve system that is connected to two endplates and an input manifold, in accordance with some embodiments of the present disclosure.

FIG. 32 is an illustration of a front view of an exemplary stepper motor proportionally controlled bellows double valve system that is connected to two endplates and an input manifold, in accordance with some embodiments of the present disclosure. As shown in FIG. 31, the system 2900 may comprise the valve manifold 224, which may be matingly secured to, via bolts, the endplate 2600 and input manifold 500. The valve manifold 224 is shown comprising output port 204. The input manifold 500 is shown as secured to the valve manifold 224 and the end plate 2601 and having the ventilation port 510 and vacuum port 512.

FIG. 33 is an illustration of a perspective view of an exemplary stepper motor proportionally controlled bellows valve manifold system in accordance with some embodiments of the present disclosure. As shown in FIG. 33, the system 3300 may comprise two endplates 2600, 2601, an input manifold 500, and four valve manifolds 224, 3301, 3302, 3303. FIG. 33 shows the modularity and scalability of the bellows valve manifold devices and systems of the present disclosure. The system 3300 may allow four user devices to be controlled and vacuum pressurized with only a single vacuum pump. The valve manifold 224 is shown comprising the output port 204. The input manifold 500 is shown as secured to the valve manifold 224 and the end plate 2601 and having the ventilation port 510 and vacuum port 512. The other three valve manifolds 3301, 3302, 3303 may be identical or very similar to the valve manifold 224, including each having an output port 3304, a motor mounting plate 3370 and two stepper motors 3371. The internal vacuum and ventilation channels go across the input manifold 500 and all four valve manifolds 224, 3301, 3302, 3303.

FIG. 34 is an illustration of a perspective view of an exemplary stepper motor proportionally controlled bellows valve manifold system with sensors and outputs in accordance with some embodiments of the present disclosure. As shown in FIG. 34, multiple valve manifold system 3300 may comprise an input manifold 500 and four valve manifolds 224, 3301, 3302, 3303. The input manifold may have ventilation input 520 and vacuum input 522, which supplies ambient air and/or a vacuum to the four manifolds 224, 3301, 3302, 3303, which may each have an output 216 and sensor 214. In some embodiments, as shown in FIG. 34, multiple valve manifold system 3300 may comprise multiple sensors 214 each paired with a respective output 216. For example, there may be four sensors 214 paired respectively with four outputs 216. These sensors 214 may be adapted to monitor the flow of the output 216 with which they are associated. The one or more sensors 214 may thereby send information relating to the flow of their respective outputs 216, such as pressure information in order to control the four vacuum valves and four ventilation valves.

Although four valve manifolds and one input manifold are shown, it should be understood that more or fewer valve manifolds and input manifolds may be combined depending on the need to what user machine the system is connected.

Figure 35:
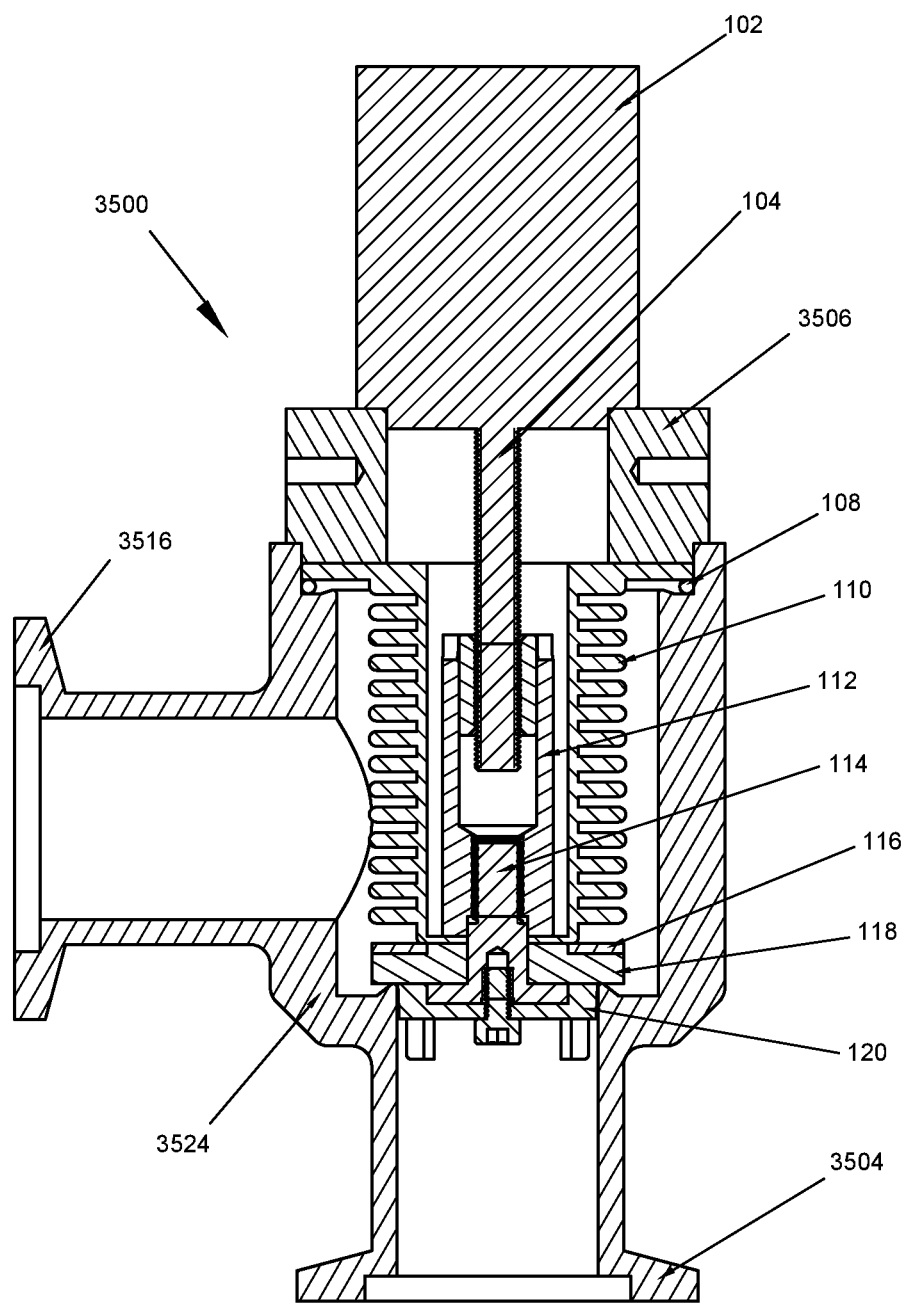
FIG. 35 is an illustration of a cross-section view of one embodiment of the stepper motor proportionally controlled bellows valve with one input and one output.

FIG. 35 is an illustration of a cross-section view of one embodiment of the stepper motor proportionally controlled bellows valve with one input and one output. As shown in FIG. 35, the stepper motor proportionally controlled bellow valve system 3500 may comprise: a stepper motor 102, motor lead screw 104, motor mounting plate 3506, O-ring 108, bellows 110, plunger adapter 112, shoulder bolt 114, one or more support washers 116, sealing washer 118, and profile washer 120. The stepper motor proportionally controlled bellow valve system 3500 may further comprise output port 3504 and input port 3516, which may be part of valve manifold 3524. This embodiment shows a single motor and a single valve controlling one input to one output. In other embodiments, the valve may work in the opposite direction, wherein the input port 3516 may be an output port and the output port 3504 may be an input port.

Figure 36:
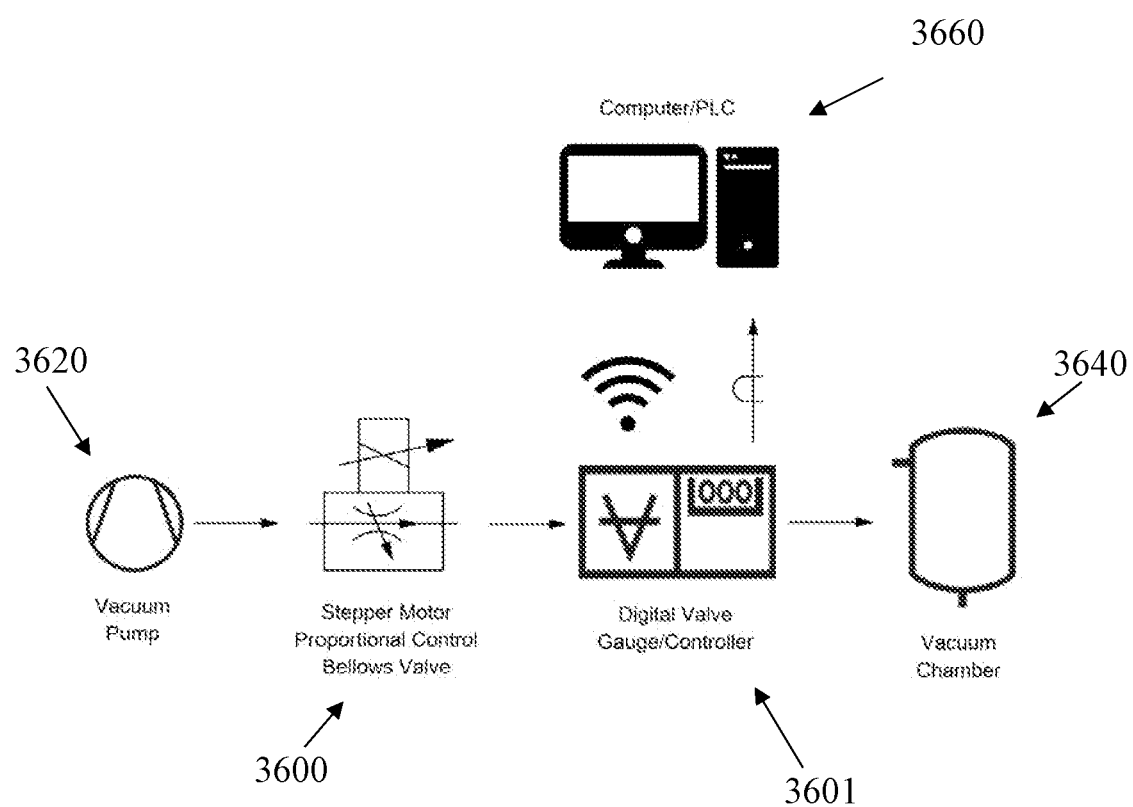
FIG. 36 is a flow diagram showing the stepper motor proportionally controlled bellows valve being controlled by a controller that is in communication with a computer.

FIG. 36 is a flow diagram showing the stepper motor proportionally controlled bellows valve being controlled by a controller that is in communication with a computer. The stepper motor proportionally controlled bellow valve system 3500 may be a valve between a vacuum pump 3620 and a vacuum chamber 3640, may comprise a sensor, and may be connected to a digital valve gauge/controller 3601, which may control the stepper motor. The digital valve gauge/controller 3601 may take manually generated or automatically generated instructions, such as to open or to close, from a computer/programmable logic controller (PLC) 3660. The sensor may sense the flow at the output to the vacuum chamber 3640 and may be used to automatically control the valve 3600 (through, preferably, computer 3660 and/or controller 3601) based on predetermined parameters. The sensor, motor, controller, and computer may be in wired or wireless communication with each other.

The systems and devices of the present disclosure have been presented in an illustrative style. The terminology employed throughout should be read in an exemplary rather than a limiting manner. While various exemplary embodiments have been shown and described, it should be apparent to one of ordinary skill in the art that there are many more embodiments that are within the scope of the devices and system of the present disclosure. Accordingly, the devices and systems of the present disclosure are not to be restricted, except in light of the appended claims and their equivalents.

Operational embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD disk, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC or may reside as discrete components in another device.

Furthermore, the one or more versions may be implemented as a method, apparatus, or article of manufacture using standard programming and/or engineering techniques to produce software, firmware, hardware, or any combination thereof to control a computer to implement the disclosed embodiments. Non-transitory computer readable media may include but are not limited to magnetic storage devices (e.g., hard disk, floppy disk, magnetic strips), optical disks (e.g., compact disk (CD), digital versatile disk (DVD)), smart cards, and flash memory devices (e.g., card, stick). Those skilled in the art will recognize many modifications may be made to this configuration without departing from the scope of the disclosed embodiments.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those of ordinary skill in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A stepper motor proportionally controlled bellows valve system comprising:
   one or more valve assemblies;
   wherein each of said one or more valve assemblies comprises:
     a valve manifold;
     wherein said valve manifold comprises a valve ventilation channel, an output port, a valve vacuum channel, a ventilation orifice, a ventilation orifice rim, a vacuum orifice, and a vacuum orifice rim;
     two linear stepper motors;
     wherein each of said two liner stepper motors comprises a motor lead screw;
     a motor mounting plate;
     wherein said motor mounting plate is configured to mount said two liner stepper motors to said valve manifold;
     a vacuum bellows valve; and a ventilation bellows valve;

wherein each of said vacuum bellows valve and said ventilation bellows valve comprises:
- a support washer;
- a sealing washer;
- a bellows;
- a plunger adapter; and
- a shoulder bolt;

wherein said plunger adapter is configured to matingly engage with said motor lead screw of one of said stepper motors;

wherein said bellows is connected to said plunger adapter, such that said plunger adapter is configured to translate rotational motion of one of said stepper motors into linear motion of said bellows, such that said bellows is configured to compress and expand based on rotational motion of one of said stepper motors;

wherein said shoulder bolt is connected to said bellows and said plunger adapter, and wherein said shoulder bolt is configured to allow said sealing washer to be mounted on said bellows;

wherein said support washer is connected to said bellows and said sealing washer;

wherein said sealing washer is configured to releasably engage with one of said ventilation orifice rim and said vacuum orifice rim;

wherein said shoulder bolt is configured to allow mounting of a profile washer, such that said profile washer is configured to protrude into one of said ventilation orifice and said vacuum orifice of said valve manifold, such that a shape and position of said profile washer defines a flow of fluid through one of said ventilation orifice and said vacuum orifice.

2. The stepper motor proportionally controlled bellows valve system of claim 1, wherein said valve manifold further comprises a sensor port, which is configured to engage with a sensor.

3. The stepper motor proportionally controlled bellows valve system of claim 2, wherein said sensor monitors an output flow.

4. The stepper motor proportionally controlled bellows valve system of claim 1, further comprising:
- an input assembly; and
- wherein said input assembly comprises: a vacuum port that is configured to engage a vacuum input; a ventilation port that is configured to engage a ventilation input; an input ventilation channel; and an input vacuum channel.

5. The stepper motor proportionally controlled bellows valve system of claim 4, wherein said input assembly is configured to be directly or indirectly connected to all of said one or more valve assemblies, such that said input ventilation channel is in fluid communication with each of said one or more valve ventilation channels and said one or more valve vacuum channels.

6. The stepper motor proportionally controlled bellows valve system of claim 4, further comprising two endplates;
  wherein said two endplates are configured to be on the ends of said stepper motor proportionally controlled bellows valve system.

7. The stepper motor proportionally controlled bellows valve system of claim 1, wherein said profile washer is configured to be removed and replaced with a replacement profile washer that is more restrictive to said flow of fluid.

8. The stepper motor proportionally controlled bellows valve system of claim 1, wherein said profile washer is configured to be removed and replaced with a replacement profile washer that is less restrictive to said flow of fluid.

\* \* \* \* \*